US006438542B1

(12) United States Patent
Koo et al.

(10) Patent No.: US 6,438,542 B1
(45) Date of Patent: Aug. 20, 2002

(54) METHOD OF OPTIMALLY DETERMINING LOSSLESS JOINS

(75) Inventors: Fred Koo, Thornhill (CA); Ting Yu Leung, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/385,325

(22) Filed: Aug. 30, 1999

(51) Int. Cl.$^7$ .............................................. G06F 17/30
(52) U.S. Cl. ...................... 707/4; 707/2; 707/3; 707/5; 707/100; 709/201
(58) Field of Search ................................ 707/1–6, 100; 709/201

(56) References Cited

U.S. PATENT DOCUMENTS

| | | | | |
|---|---|---|---|---|
| 5,542,073 A | | 7/1996 | Schiefer et al. ................. | 707/2 |
| 5,548,758 A | | 8/1996 | Pirahesh et al. ................ | 707/2 |
| 5,590,324 A | | 12/1996 | Leung et al. .................. | 707/5 |
| 5,659,725 A | | 8/1997 | Levy et al. ..................... | 707/3 |
| 5,671,403 A | | 9/1997 | Shekita et al. ................. | 707/3 |
| 5,822,750 A | | 10/1998 | Jou et al. ........................ | 707/2 |
| 5,832,477 A | * | 11/1998 | Bhargava et al. .............. | 707/2 |
| 5,848,406 A | * | 12/1998 | Mani et al. ..................... | 707/2 |
| 5,864,842 A | | 1/1999 | Pederson et al. .............. | 707/3 |
| 5,930,785 A | | 7/1999 | Lohman et al. ................ | 707/2 |
| 5,960,427 A | * | 9/1999 | Goel et al. ...................... | 707/4 |
| 5,991,754 A | * | 11/1999 | Raitto et al. .................... | 707/2 |

FOREIGN PATENT DOCUMENTS

| | | |
|---|---|---|
| CA | 2168287 | 10/1996 |
| EP | 0 877 327 A2 | 11/1998 |

OTHER PUBLICATIONS

U. Chakravarthy et al., "Logic–Based Approach to Semantic Query Optimization", ACM Transactions on Database Systems, vol. 15, No., 2, 1990, pp. 162–207.
Sreekumar T. Shenoy et al., "A System for Semantic Query Optimization", ACM 0–89791–236–5/87/0005/0181, 1987, pp. 181–188.
J.K. Mullin, "Estimating the Size of a Relational Join", Informational Systems, vol., 18, No. 3, pp. 189–196. Apr. 1993, (Abstract only—1pp).
T. Zurek, "Optimisation of Partitioned Temporal Joins", Advances in Database: 15$^{th}$ British National Conference on Databases, BNCOD 15. (proceedings), pp. 101–115, Published: Berlin, Germany, 1997, (Abstract only—1pp).
K. Munakata, "Integration of Maximum Information Using Outerjoins, Predicates and Foreign Functions", IEICE Transactions on Information and Systems, vol. E82–D, No. 1, Jan. 1999, pp. 64–75, (Abstract only—1pp).
IBM Research Disclosure, "Implement LDAP Search Queries with SQL", Document No. 41695, Dec. 1998, pp. 1663–1665.

\* cited by examiner

Primary Examiner—John Breene
Assistant Examiner—Cheryl R. Lewis
(74) Attorney, Agent, or Firm—Gates & Cooper LLP

(57) ABSTRACT

A method, apparatus, and article of manufacture for optimizing a query being performed by a computer system to retrieve data from a database stored on the computer system. The query is analyzed to identify any joins therein that are lossless and to identify any tables of the identified joins that are eligible for removal. This analysis includes partitioning the joins into lossless and lossy joins, and partitioning the tables of the joins according to their associated quantifiers, wherein each of the quantifiers has a quantifier state indicating whether the table participates in a join that is lossless. The query is then rewritten to eliminate the identified tables that are eligible for removal.

105 Claims, 18 Drawing Sheets

METHOD OF OPTIMALLY DETERMINING LOSSLESS JOINS

BACKGROUND OF THE INVENTION

1. Field of the Invention

This invention relates in general to database management systems performed by computers, and in particular, to a method of optimally determining lossless join operations.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Institute (ANSI) and the International Standards Organization (ISO).

In a data warehouse, referential integrity constraints are often created to maintain the data integrity across different tables. Referential integrity imposes a constraint between tables such that whenever a tuple is inserted into a child table, there will be exactly one matched row in the parent table. In other words, the join of parent and child tables does not reduce the number of rows of the child table that satisfy a WHERE condition. Therefore, the join is considered a lossless join.

It is well-known in research literature that the parent table can be eliminated from the query if its columns are not selected, and hence there is a need in the art for an optimizing method that eliminates parent tables where the join between the parent and child table is a lossless join. Specifically, there is a need in the art for identifying which joins are lossless and which tables are eligible for removal.

SUMMARY OF THE INVENTION

To overcome the limitations in the prior art described above, and to overcome other limitations that will become apparent upon reading and understanding the present specification, the present invention discloses a method, apparatus, and article of manufacture for optimizing a query being performed by a computer system to retrieve data from a database stored on the computer system. The query is analyzed to identify any joins therein that are lossless and to identify any tables of the identified joins that are eligible for removal. This analysis includes partitioning the joins into lossless and lossy joins, and partitioning the tables of the joins according to their associated quantifiers, wherein each of the quantifiers has a quantifier state indicating whether the table participates in a join that is lossless. The query is then rewritten to eliminate the identified tables that are eligible for removal.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

HARDWARE AND SOFTWARE ENVIRONMENT

Figure 1:
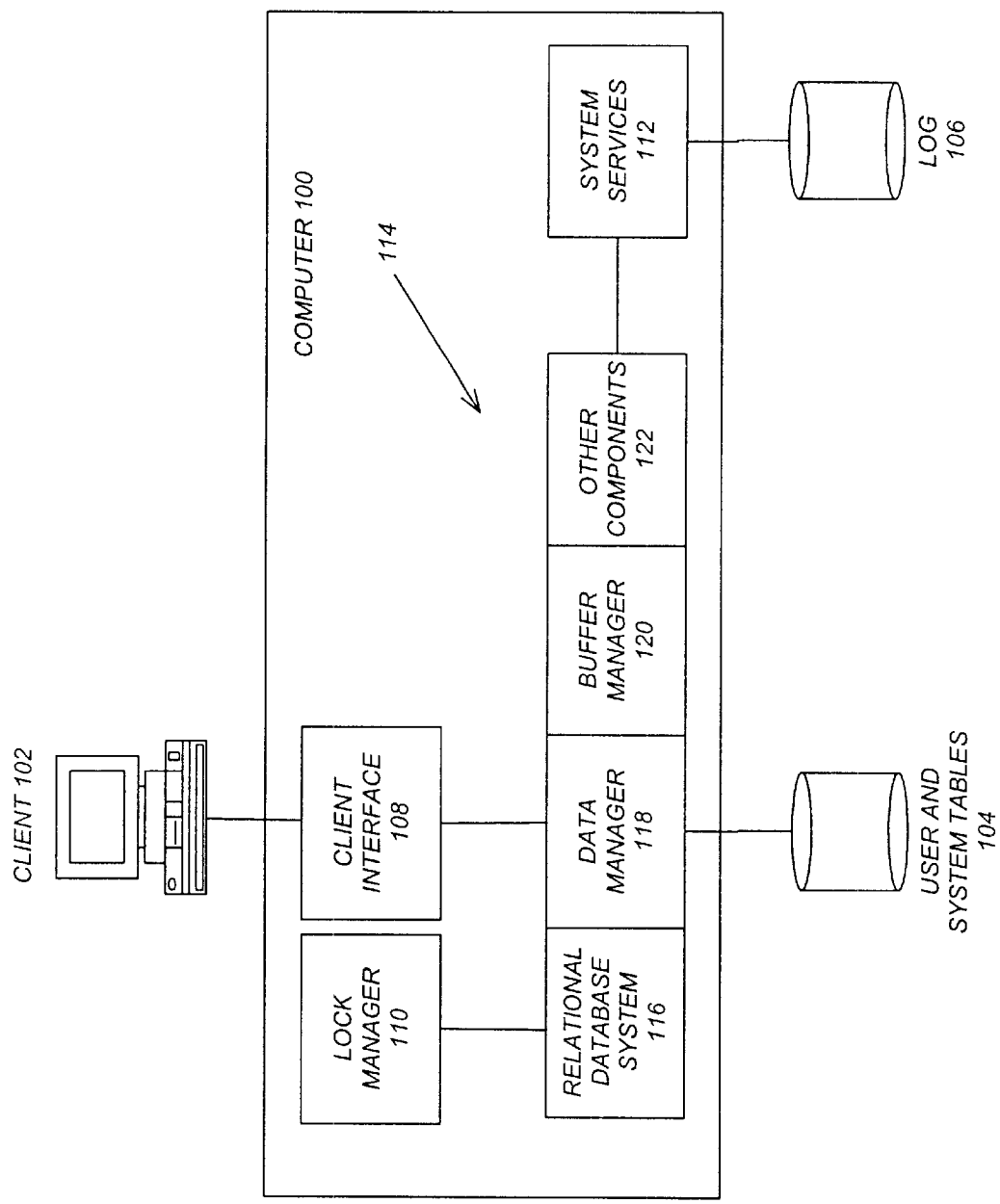
FIG. 1 illustrates an exemplary hardware and software environment that could be used with the preferred embodiment of the present invention.

FIG. 1 illustrates an exemplary hardware and software environment that could be used with the preferred embodiment of the present invention. In the exemplary environment, a server computer 100 is connected to one or more client computers 102 or terminals. The server computer 100 executes a relational database management system (RDBMS) that manages user and system tables 104 and includes a system log 106. In the preferred embodiment of the present invention, the RDBMS comprises the DataBase 2 (DB2™) Universal DataBase (UDB™) product offered by IBM Corporation, although those skilled in the art will recognize that the present invention has application to any RDBMS. The client computers 102 interface to the RDBMS via a client interface component 108.

As illustrated in FIG. 1, the RDBMS includes three major components: the Resource Lock Manager (RLM) 110, the Systems Services module 112, and the Database Services module 114. The RLM 110 handles locking services, because the RDBMS treats data as a shared resource, thereby allowing any number of users to access the same data simultaneously, and thus concurrency control is required to isolate users and to maintain data integrity. The Systems Services module 112 controls the overall RDBMS execution environment, including managing log data sets 106, gathering statistics, handling startup and shutdown, and providing management support.

At the heart of the RDBMS is the Database Services module 114. The Database Services module 114 contains several submodules, including a Relational Database System (RDS) 116, Data Manager 118, Buffer Manager 120, and Other Components 122 such as an SQL compiler/interpreter. These submodules support the functions of the SQL language, i.e., definition, access control, retrieval, and update.

Generally, the RDBMS comprises logic and/or data that is embodied in or retrievable from a device, medium, or carrier, e.g., a fixed or removable data storage device, a remote device coupled to the computer by a data communications device, etc. Moreover, this logic and/or data, when read, executed, and/or interpreted by the computer 100, cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" as used herein is intended to encompass logic and/or data embodied in or accessible from any device, carrier, or media.

Of course, those skilled in the art will recognize many modifications may be made to this configuration without departing from the scope of the present invention. For example, those skilled in the art will recognize that any combination of the above components, or any number of different components, including computer programs, peripherals, and other devices, may be used to implement the present invention, so long as similar functions are performed thereby.

INTERACTIVE SQL EXECUTION

Figure 2:
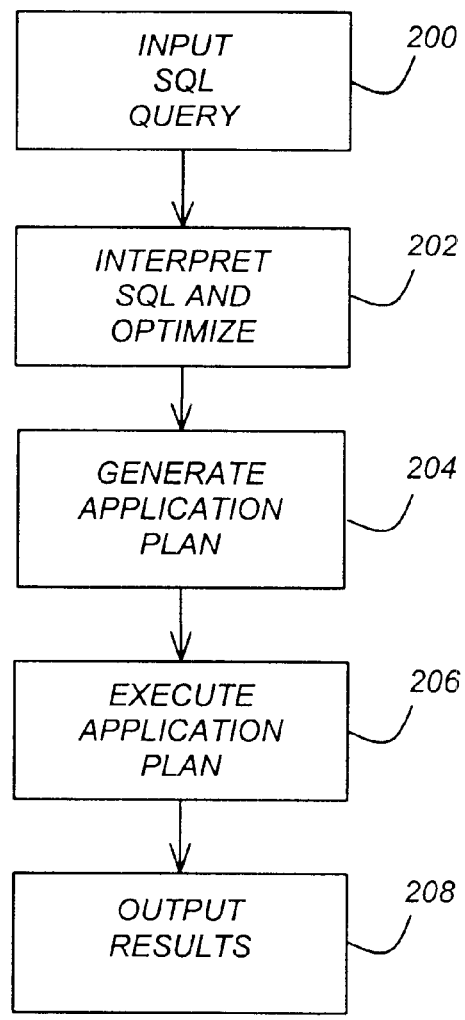
FIG. 2 is a flowchart illustrating the steps necessary for the interpretation and execution of SQL statements in an interactive environment according to the preferred embodiment of the present invention.

FIG. 2 is a flowchart illustrating the steps necessary for the interpretation and execution of SQL statements in an interactive environment according to the preferred embodiment of the present invention. Block 200 represents the input of SQL statements into the computer 100. Block 202 represents the step of interpreting or compiling the SQL statements, including the step of optimizing the SQL statements. Generally, the SQL statements received as input specify only the desired data, but not how to retrieve the data. This step considers both the available access paths (indexes, sequential reads, etc.) and system held statistics on the data to be accessed (the size of the table, the number of distinct values in a particular column, etc.), to choose what it considers to be the most efficient access path for the query. Specifically, at Block 202, the RDBMS may transform or optimize the SQL query in a manner described in more detail later in this specification. Block 204 represents the step of generating a compiled set of runtime structures called an application plan from the compiled SQL statements. Block 206 represents the execution of the application plan, and block 208 represents the output of the results.

EMBEDDED/BATCH SQL EXECUTION

Figure 3:
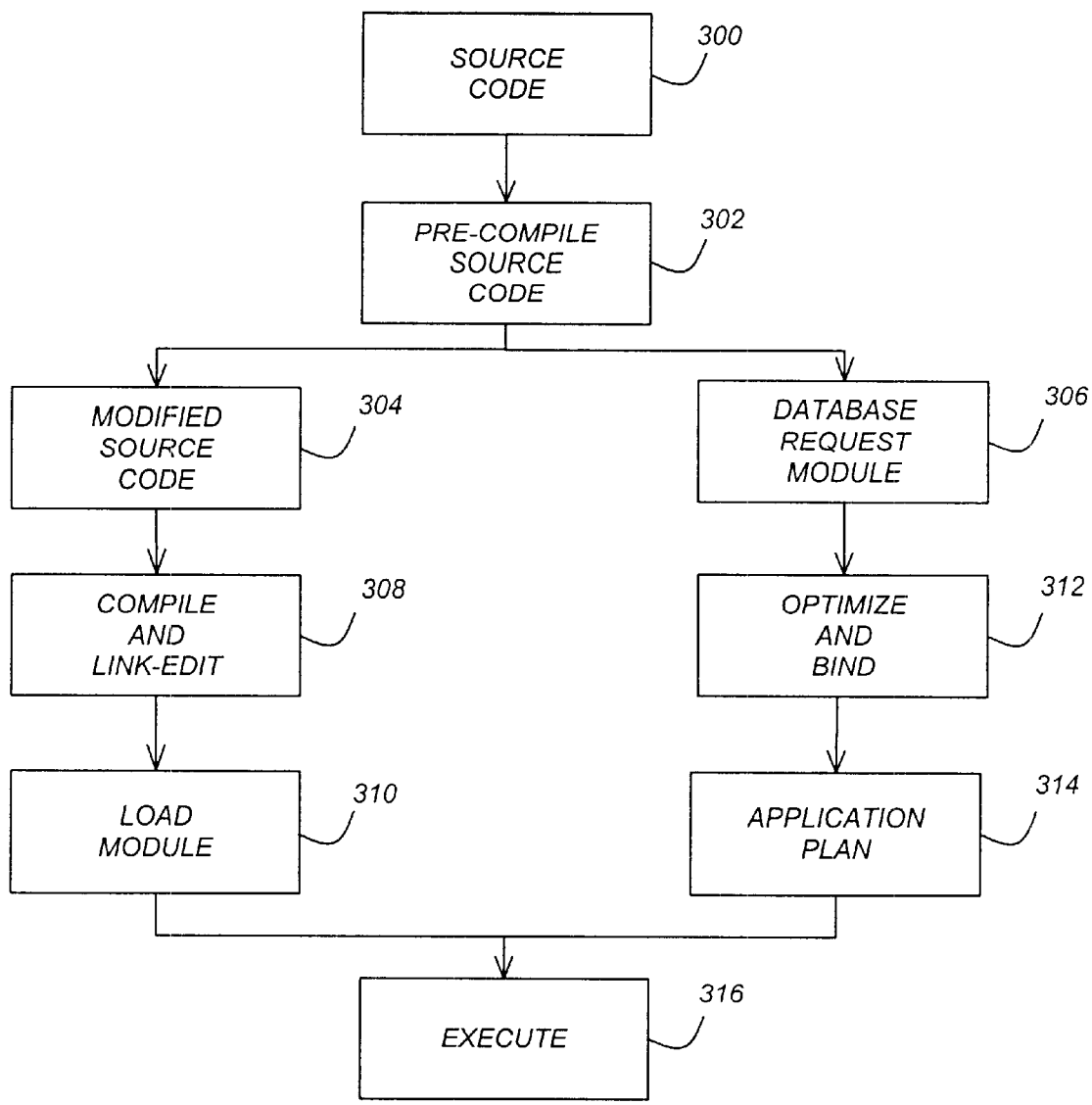
FIG. 3 is a flowchart illustrating the steps necessary for the interpretation and execution of SQL statements embedded in source code according to the preferred embodiment of the present invention.

FIG. 3 is a flowchart illustrating the steps necessary for the interpretation and execution of SQL statements embedded in source code according to the preferred embodiment of the present invention. Block 300 represents program source code containing a host language (such as COBOL or C) and embedded SQL statements. The program source code is then input to a pre-compile step 302. There are two outputs from the pre-compile step 302: a modified source module 304 and a Database Request Module (DBRM) 306. The modified source module 304 contains host language calls to the RDBMS, which the pre-compile step 302 inserts in place of SQL statements. The DBRM 306 is comprised of the SQL statements from the program source code 300. A compile and link-edit step 308 uses the modified source module 304 to produce a load module 310, while an optimize and bind step 312 uses the DBRM 306 to produce a compiled set of runtime structures for the application plan 314. As indicated above in conjunction with FIG. 2, the SQL statements from the program source code 300 specify only the desired data, but not how to retrieve the data. The optimize and bind step 312 may reorder or optimize the SQL statements in a manner described in more detail later in this specification. Thereafter, the optimize and bind step 312 considers both the available access paths (indexes, sequential reads, etc.) and system held statistics on the data to be accessed (the size of the table, the number of distinct values in a particular column, etc.), to choose what it considers to be the most efficient access path for the query. The load module 310 and application plan 314 are then executed together at step 316.

DESCRIPTION OF THE OPTIMIZATION TECHNIQUE

The preferred embodiment of the present invention discloses an optimization technique that is typically performed at step 202 of FIG. 2 or step 312 of FIG. 3.

In a data warehouse, referential integrity constraints are often created to maintain the data integrity across different tables.

Consider the following example:
CREATE TABLE STARS.CUSTOMER(
    CUSTID CHAR(10) NOT NULL WITH DEFAULT PRIMARY KEY,
    GENDER CHAR(1) NOT NULL,
    MARITAL_STATUS CHAR(1) NOT NULL,
    INCOME_RANGE INTEGER NOT NULL,
    ZIPCODE INTEGER NOT NULL,
    RESIDENCE VARCHAR(5) NOT NULL,
    BIRTHDATE DATE NOT NULL,
    PRIMARY_JOB INTEGER,
    SECONDARY_JOB INTEGER,
    SMOKER INTEGER)
CREATE TABLE STARS ACCOUNT(
    ACCTID CHAR(10) NOT NULL WITH DEFAULT PRIMARY KEY,
    CUSTID CHAR(10) NOT NULL WITH DEFAULT,
    BALANCE FLOAT,
    CONSTRAINT CUST_ACCT FOREIGN KEY (CUSTID)
REFERENCES STARS.CUSTOMER)

In the above example, all primary/foreign key columns are not nullable.

The CUSTOMER table has a primary key "CUSTID" and the account table has a primary key "ACCTID". The ACCOUNT table also has a foreign key "CUSTID" referencing the CUSTOMER table. This primary and foreign key relationship defines "referential integrity" constraint "CUST_ACCT" between these tables (or simply called the RI constraint).

In general, the referenced table "STARS.CUSTOMER" is referred to as the parent table, whereas the referencing table "STARS ACCOUNT" as the child table. The RI constraint "CUST_ACCT" between these two tables imposes a constraint such that whenever a tuple is inserted into the child table (ACCOUNT), there will be exactly one matched row in the parent table (CUSTOMER). In simple terms, for every account, there must be one customer (however, there may be some customers who do not have any accounts). On the other hand, a tuple cannot be deleted from the STARS.CUSTOMER table unless all corresponding tuples in the STARS.ACCOUNT table have been removed.

Consider the following join query:

SELECT COUNT(*)
FROM STARS ACCOUNT A, STARS.CUSTOMER C
WHERE A.CUSTID=C.CUSTID AND A.BALANCE<10

Note that every row in STARS.ACCOUNT with a balance less than 10 will have exactly one matching row in STARS.CUSTOMER, because the join columns (A.CUSTID, C.CUSTID) are foreign and primary keys. In other words, the join of STARS.CUSTOMER with STARS.ACCOUNT does not reduce the number of rows of STARS ACCOUNT that satisfy the WHERE condition. Therefore, the join is considered a lossless join. It is well known in research literature that the parent table (STARS.CUSTOMER in this example) can be eliminated from the query if its columns are not selected, and hence the above query can be rewritten as follows:

SELECT COUNT(*)
FROM STARS ACCOUNT A
WHERE A.BALANCE<10

The present invention describes a method of optimally identifying which joins are lossless and which tables are eligible for removal. In this process, the joins are partitioned into lossless or lossy. The parent table of a lossless join is eligible for removal from the query. For convenience, the parent tables of lossless joins are referred to as "lossless"; otherwise, the tables are lossy.

Section 1) Fundamentals 1.1) Quantifiers and Tables.

In this specification, quantifiers and tables are used interchangeably. A quantifier is denoted as QUN. Quantifiers have states indicating whether a table participates in a lossless join or not:

PS (Potentially Single) state, i.e., potentially only one row is retrieved,

S (Single) state, i.e., it can be proven that only one row is retrieved, and

N (Lossy) state, i.e., it can be proven that the state is not PS or S.

In the partitioning method presented herein, all quantifiers begin with state PS. PS is the lowest state and N is the highest state.

The following terminology is used in this discussion:

a quantifier with PS state: a PS-qun, a quantifier with S state: a S-qun, a quantifier with N state: a N-qun, left hand side: LHS, right hand side: RHS.

Figure 4:
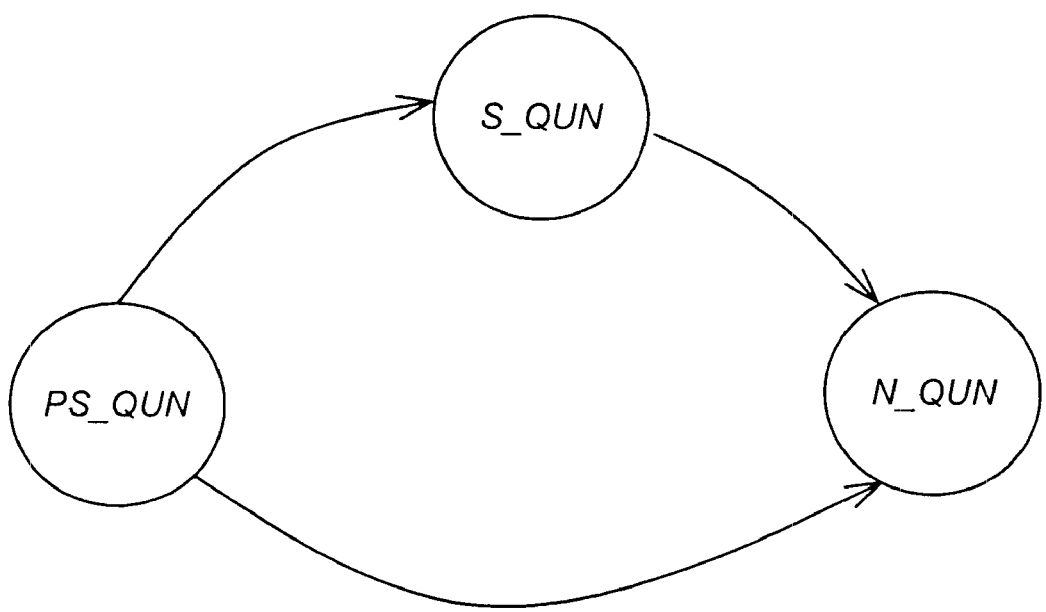
FIG. 4 is a state diagram that depicts the transition and promotion of quantifier states according to the preferred embodiment of the present invention.

Quantifiers are promoted from a lower state to a higher state and quantifiers are never demoted (i.e., N to S never happens). The state diagram of FIG. 4 depicts the transition and promotion of quantifier states.

1.2) Column Equivalent Predicates

This partitioning method considers the full set of column equivalent (or column transitivity) predicates. Consider the join predicates:

A=B and B=C

For the above join predicates, the method considers all the joins among columns A, B and C, and hence the following equivalent three predicates are considered:

A=B and B=C and C=A

That is, implied join predicates are taken into consideration in the partitioning method. The columns (A, B, and C) are said to form a column equivalent class.

If a column equivalent class has N columns, then the minimal number of join predicates required is: N−1. Since the method considers the full set of join predicates, the total number of join predicates is N*(N−1)/2.

The difference between these two numbers is the number of the implied joins due to column transitivity. This number is referred to as ExtrajoinCnt, which is N*(N−1)/2−(N−1). In the above example, ExtrajoinCnt is 1.

Each ExtrajoinCnt represents the quota for which join predicates (including implied join predicates) can be dropped without affecting the correctness of the joins.

Consider the join predicates in a query:

A=B and B=C and X=Y and Y=Z

There are two column equivalent classes:

(A, B, C) and (X, Y, Z)

Each class has ExtrajoinCnt as 1. In this method, all six predicates are considered:

A=B and B=C and A=C and X=Y and Y=Z and X=Z

Without the loss of generality, tables involved in other types of predicates (such as local predicates, predicates with expression, etc.) are immediately considered as N-qun, i.e., they are lossy joins (e.g., a local predicate may always be false and thus no rows will be preserved).

In the subsequent discussion, the method only considers join predicates in the form of:

LHScol=RHScol where LHScol and RHScol are join columns.

Example 1.2.1:

Non-nullable columns {FK1,FK2} of table A together comprise a composite foreign key that references table B whose primary key is {PK1,PK2}. Suppose a query contains only the following predicates:

A.FK1=B.PK1 and A.FK2=B.PK2

The join between tables A and B is N:1 via a composite RI join, which consists of the two join predicates. That is, each A row matches one B row, whereas each B row may match multiple A rows. The join predicates that form an RI join relationship is referred to as "RI join predicates".

In this invention, a primary key is denoted as PK and a foreign key as denoted as FK. In other words, "PK=FK" forms the RI join between the parent and child tables. For a multiple columns primary key, the columns are denoted as PK1, PK2, . . . , PKN. Similarly, a multiple columns foreign key is denoted as FK1, FK2, . . . , FKN. That is, "PK1=FK1 and PK2=FK2 and . . . " form the RI joins between the parent and child tables.

1.3) Joins. Join Predicates and Join Types

When there is a non-empty set of join predicates involving two quantifiers, it is said that the two quantifiers are connected via a join. There are three types of join predicates:

(1) EXTRA—A non-RI join predicate that need not be applied (ExtrajoinCnt shows that quota has not been reached but not yet confirmed) is an EXTRA join predicate.

(2) DROPPED—A join predicate that has been removed from future consideration is a DROPPED join predicate.

(3) CLEAN—A RI join predicate or a non-RI join predicate that cannot be avoided because there is no quota left (i.e., ExtrajoinCnt is zero) is a CLEAN join predicate.

There are four join types between two tables, Q1 and Q2:
(1) 1:N—The query must contain all the RI join predicates that form the RI relationship where Q1 is the parent table and Q2 is the child table. EXTRA and/or DROPPED join predicates are allowed between Q1 and Q2. In other words, Q1 is considered lossless. This join type is sensitive to the position of the join columns involved in the join predicates; if join columns are commuted, the join becomes N:1.
(2) N:1—This join type is the same as 1:N except the role of tables as parent/child are switched.
(3) N:N—The join contains at least one lossy join predicate that must be applied (i.e., ExtrajoinCnt=0).
(4) EXTRA—The query must contain only EXTRA and/or DROPPED join predicates. Hence, an EXTRA join is a lossy join that may be avoidable. Note that the EXTRA join may turn into a N:N join, if ExtrajoinCnt has been used up (See example 3.1).

Example 1.3.1:

Columns {FK1,FK2} of table A is a composite foreign key that references table B whose primary key is {PK1, PK2}. Consider the following query predicate:

A.FK1=B.PK1

Since A.FK2=B.PK2 is absent from the query, the join is N:N, i.e., a lossy join.

Example 1.3.2:

Column A.FK in table A is a foreign key that references B.PK in table B. Consider the following query predicates:

A.FK=B.PK and A.C1=B.C1

If A.C1=B.C1 is avoidable (i.e., EXTRA/DROPPED), then the join is a 1:N join.

If A.C1=B.C1 is unavoidable (i.e., CLEAN), then the join is a N:N join.

Section 2) The Approach

Figure 5:
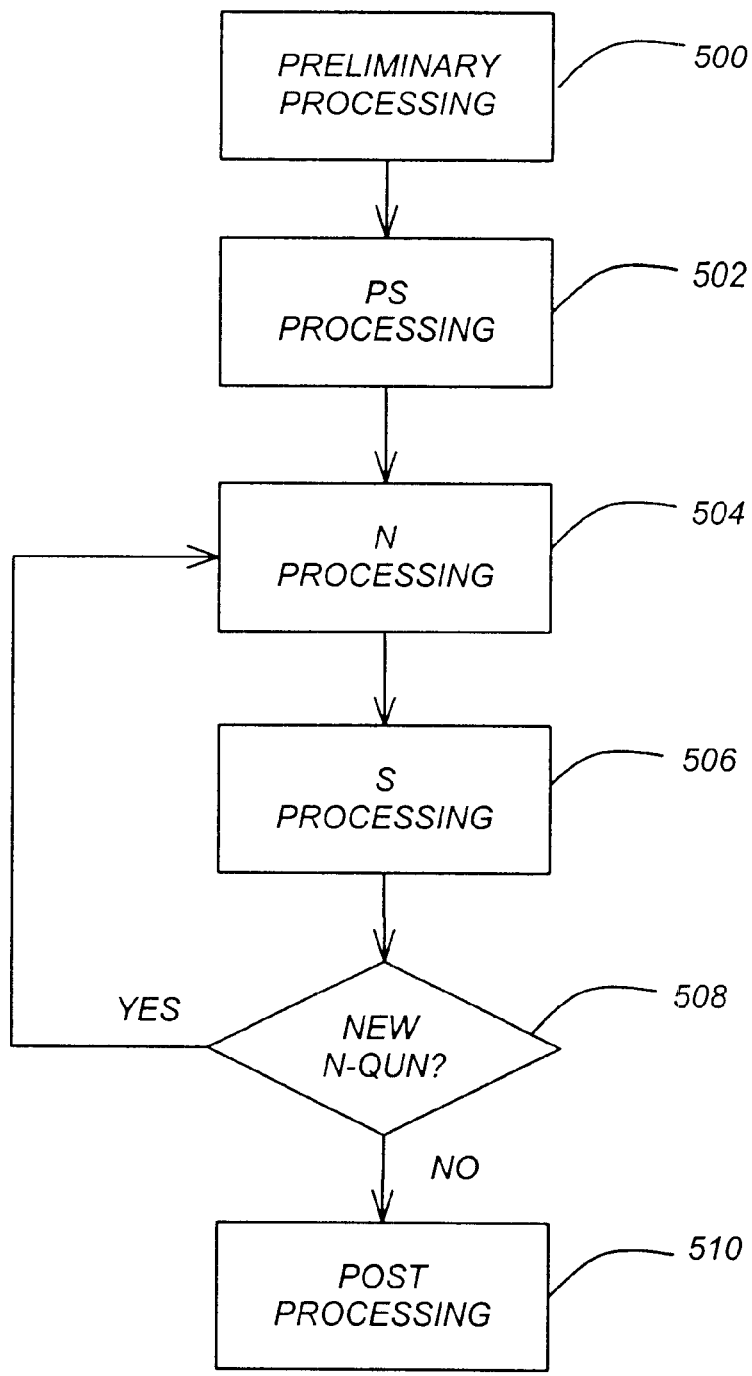
FIG. 5 is a flowchart that illustrates the 5 step process according to the preferred embodiment of the present invention.

FIG. 5 is a flowchart that illustrates the approach of the present invention, which involves a 5-step process. In these steps, all quantifiers are initially PS-qun. Block 500 represents Step 1, which is Preliminary Processing. Block 502 represents Step 2, which is PS-Processing. Block 504 represents Step 3, which is N-Processing. Block 506 represents Step 4, which is S-Processing. Block 508 is a decision block that determines whether there are any new N-qun's. If so, control returns to Block 504; otherwise, control transfers to Block 510. Block 510 represents Step 5, which is Post-Processing. The specifics of these steps are described in more detail below.

2.1) Step 1—Preliminary Processing

Step 1 contains preliminary checks to filter out quantifiers (by promoting the quantifier state to N) that are ineligible to be S-qun. For example, quantifiers that involved in a non-column equivalent predicate or local predicate (e.g., C>0) are immediately promoted to the N state.

Figure 6:
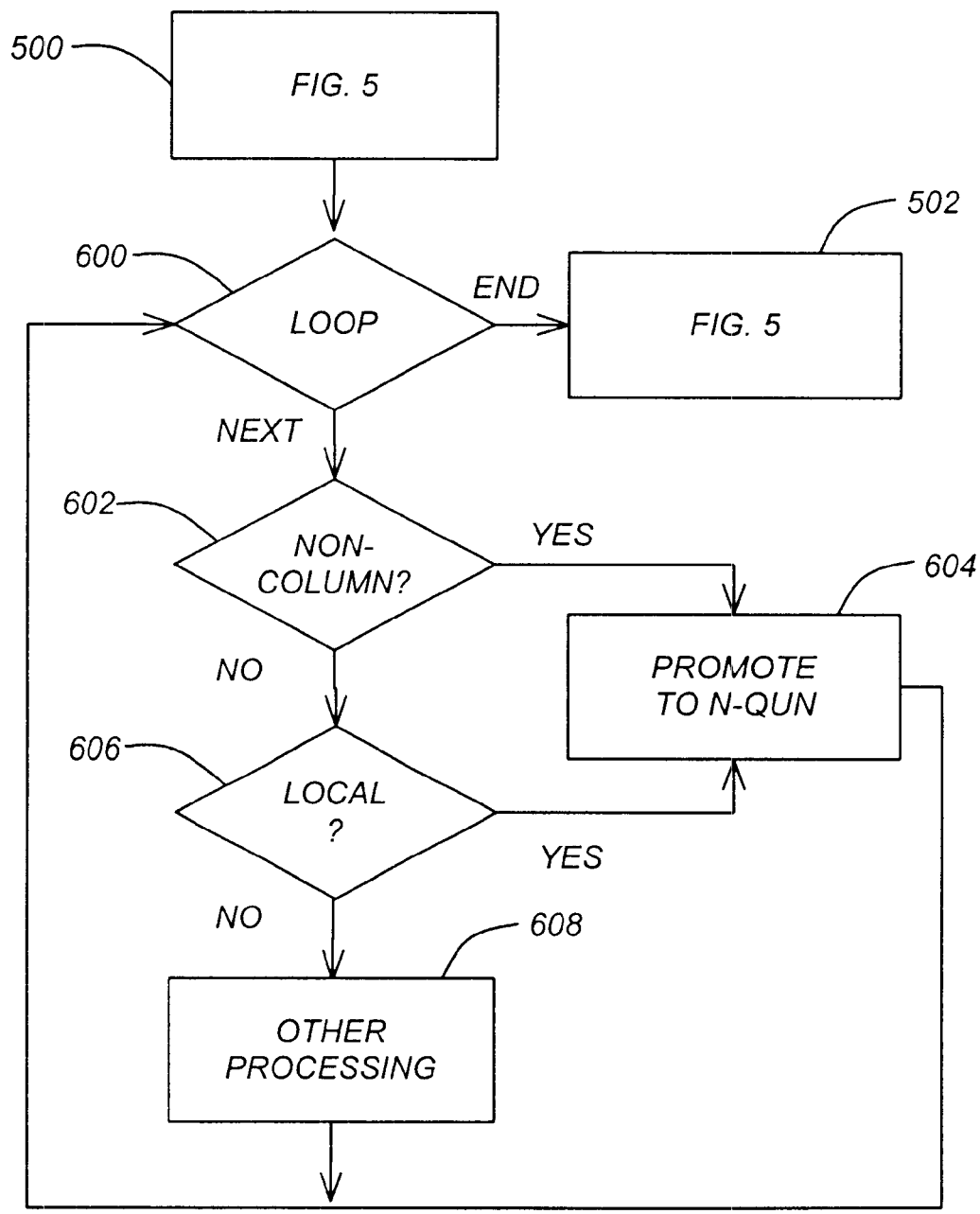
FIG. 6 is a flowchart that illustrates the logic of Step 1 of the 5 step process according to the preferred embodiment of the present invention.

FIG. 6 is a flowchart that illustrates the logic of Step 1 of the 5 step process according to the preferred embodiment of the present invention.

The flowchart is entered via Block 500 of FIG. 5.

Block 600 is a decision block that represents the method looping through quantifiers. For each execution of the loop, control then transfers to Block 602; upon completion of the loop, control transfers to Block 608, which represents a return to Block 502 of FIG. 5.

Block 602 is a decision block that represents the method determining whether the quantifier is involved in a non-column equivalent predicate. If so, control transfers to Block 604, which represents the quantifier being promoted to N-qun; otherwise, control transfers to Block 606.

Block 606 is a decision block that represents the method determining whether the quantifier is involved in a local predicate. If so, control transfers to Block 604, which represents the quantifier being promoted to N-qun; otherwise, control transfers to Block 608.

Block 608 represents the method performing other processing (if necessary). Thereafter, control returns to Block 600.

2.2) Step 2—PS-Processing

Before entering Step 2, each quantifier must be either PS-qun or N-qun (promoted during Step 1—Preliminary Processing). This step only processes quantifiers in the PS state. For each PS-qun, this step determines the join types of all joins that involve the PS-qun and determines whether the PS-qun should be promoted to N-qun. Without loss of generality, it is assumed that the PS-qun is placed at the left hand side (LHS) of the join predicates. As such, this PS-qun is denoted as LHSqun, whereas the other participating quantifier is referred to as RHSqun.

Each join that involves the PS-qun is assigned as the following type:
(1) 1:N—the PS-qun is a parent of another quantifier.
(2) N:1—the PS-qun is a child of another quantifier.
(3) N:N—an unavoidable lossy join.
(4) EXTRA—a potentially avoidable lossy join.

When all the joins that involve the PS-qun (LHSqun is the PS-qun) have been determined, the following actions are performed:

If no join involves the PS-qun (i.e., the PS-qun is an isolated quantifier), then promote the PS-qun to N-qun.

If LHSqun has at least one N:N (unavoidable lossy join), then promote LHSqun and the other quantifier(s) (those that are N:N joined to the PS-qun) to the N state.

If LHSqun has at least one N:1 join and the rest are EXTRA joins, then promote LHSqun to N-qun.

If LHSqun has more than one 1:N join and the rest are EXTRA joins, then perform "FK is PK" check Described in Section 4 below).

If LHSqun is 1:N joined with RHSqun and the foreign key of RHSqun are nullable key column(s), then promote RHSqun to N-qun.

Otherwise, LHSqun remains as PS-qun.

Figure 7A:
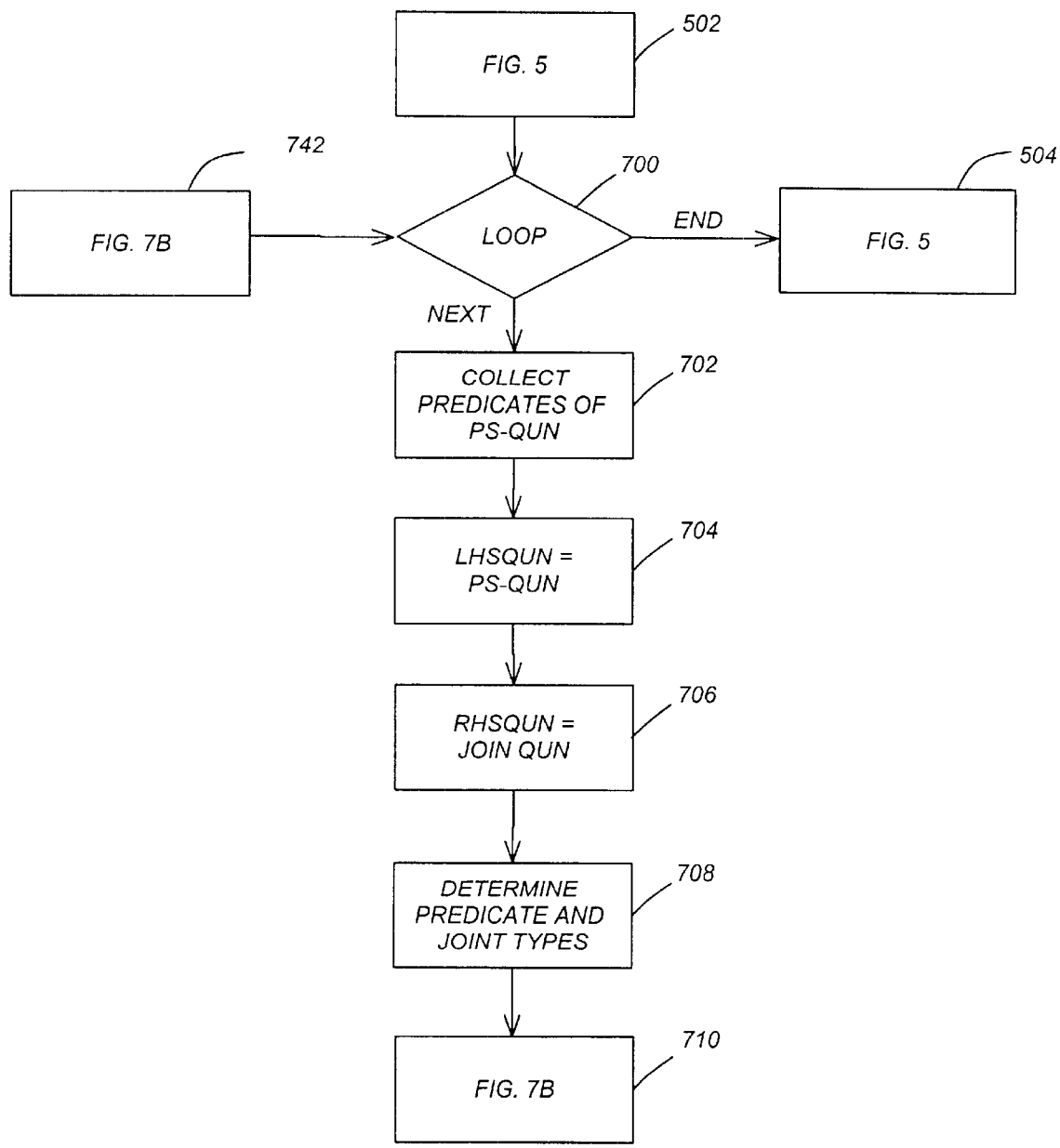
FIGS. 7A and 7B together are a flowchart that illustrates the logic of Step 2 of the 5 step process according to the preferred embodiment of the present invention.
Figure 7B:
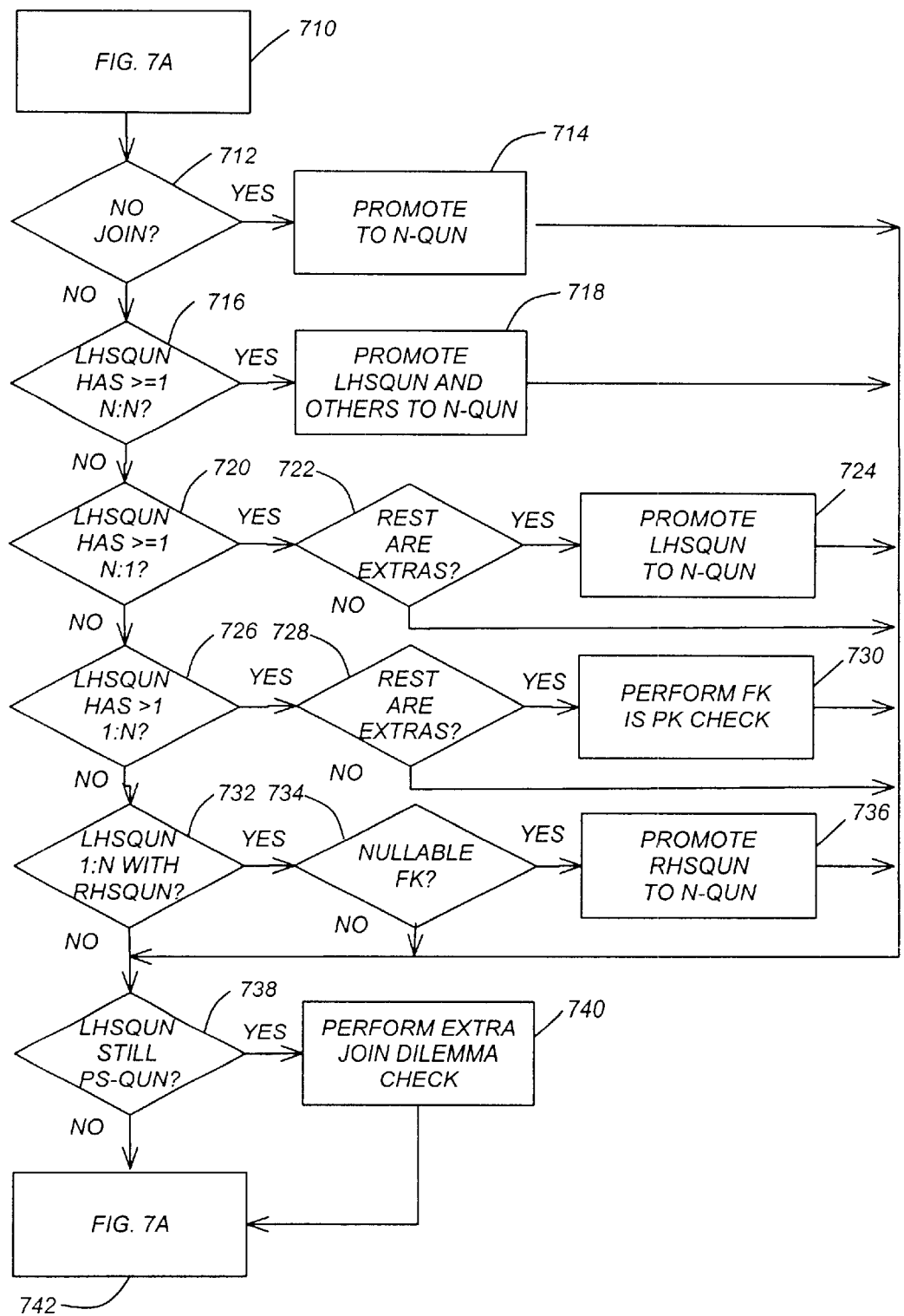

FIGS. 7A and 7B together are a flowchart that illustrates the logic of Step 2 of the 5 step process according to the preferred embodiment of the present invention.

The flowchart is entered via Block 502 of FIG. 5.

Referring to FIG. 7A, Block 700 is a decision block that represents the method looping through PS-qun's. For each execution of the loop, control then transfers to Block 702; upon completion of the loop, control transfers to Block 704, which represents a return to Block 504 of FIG. 5.

Block 702 represents the method collecting predicates involved in the PS-qun.

Block 704 represents the method setting LHSqun to PS-qun.

Block 706 represents the method setting RHSqun to the joining quantifier (qun).

Block 708 represents the method determining the predicate type and the join type.

Block 710 represents the method transferring control to FIG. 7B.

Referring to FIG. 7B, Block 710 represents the method transferring control from FIG. 7A.

Block 712 is a decision block that represents the method determining whether the PS-qun is an isolated quantifier (i.e., no join involves the PS-qun). If so, control transfers to Block 714, which represents the method promoting the PS-qun to N-qun; otherwise, control transfers to Block 716.

Block 716 is a decision block that represents the method determining whether the LHSqun has at least one N:N (unavoidable lossy join). If so, control transfers to Block 718, which represents the method promoting the LHSqun and the other quantifier(s) (N:N joined) to N-qun; otherwise, control transfers to Block 720.

Block 720 is a decision block that represents the method determining whether the LHSqun has at least one N:1 join. If so, control transfers to Block 722; otherwise, control transfers to Block 716.

Block 722 is a decision block that represents the method determining whether the rest of the quantifiers are EXTRA joins. If so, control transfers to Block 724, which represents the method promoting the LHSqun to N-qun; otherwise, control transfers to Block 738.

Block 726 is a decision block that represents the method determining whether the LHSqun has more than one 1:N join. If so, control transfers to Block 728; otherwise, control transfers to Block 732.

Block 728 is a decision block that represents the method determining whether the rest of the quantifiers are EXTRA joins. If so, control transfers to Block 730, which represents the method performing the "FK is PK" check (described in Section 4 below); otherwise, control transfers to Block 738.

Block 732 is a decision block that represents the method determining whether the LHSqun is 1:N joined with RHSqun. If so, control transfers to Block 734; otherwise, control transfers to Block 738.

Block 734 is a decision block that represents the method determining whether the foreign key (FK) of RHSqun are nullable key column(s). If so, control transfers to Block 736, which represents the method promoting RHSqun to N-qun; otherwise, control transfers to Block 738.

Block 738 is a decision block that represents the method determining whether the LHSqun is still a PS-qun. If so, control transfers to Block 740, which represents the method performing an EXTRA join dilemma check; otherwise, control transfers to Block 742, which represents control returning to FIG. 7A.

2.3) Step 3—N-Processing

Step 3 process only those quantifiers that are newly promoted to the N state. This is the most aggressive part of the partitioning method, wherein all quantifier(s) that are 1:N/N:1/N:N joined with the N-qun are determined. In addition, all joins that are processed during this step are removed from future consideration.

The N-qun being processed is always placed at RHS with its joining quantifier (a PS/S-qun) on LHS. If LHSqun is already a N-qun, the method removes all join predicates as if processed and the method moves on to a new LHSqun (then the join type must be N:N.)

Figure 8A:
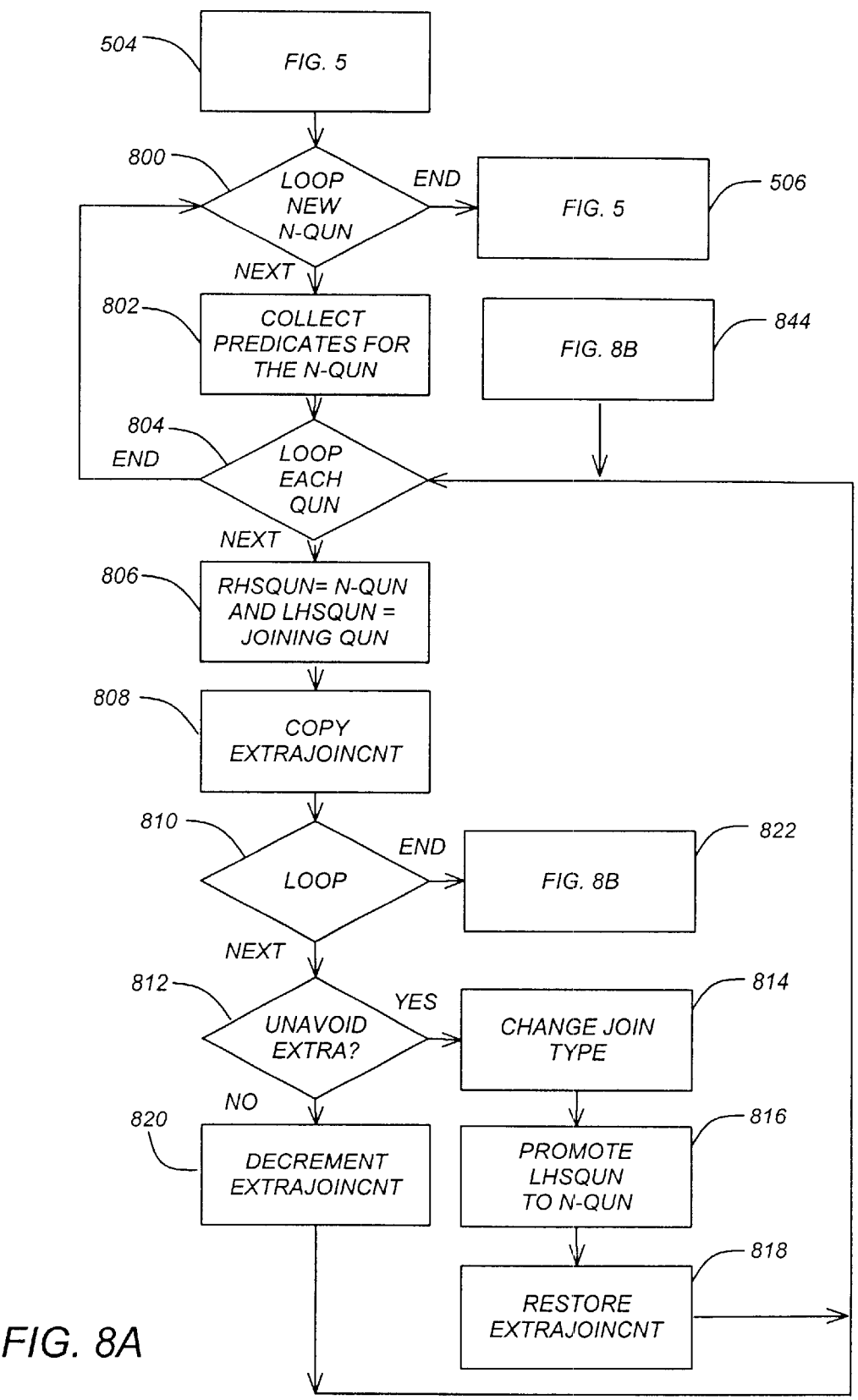
FIGS. 8A and 8B together are a flowchart that illustrates the logic of Step 3 of the 5 step process according to the preferred embodiment of the present invention.
Figure 8B:
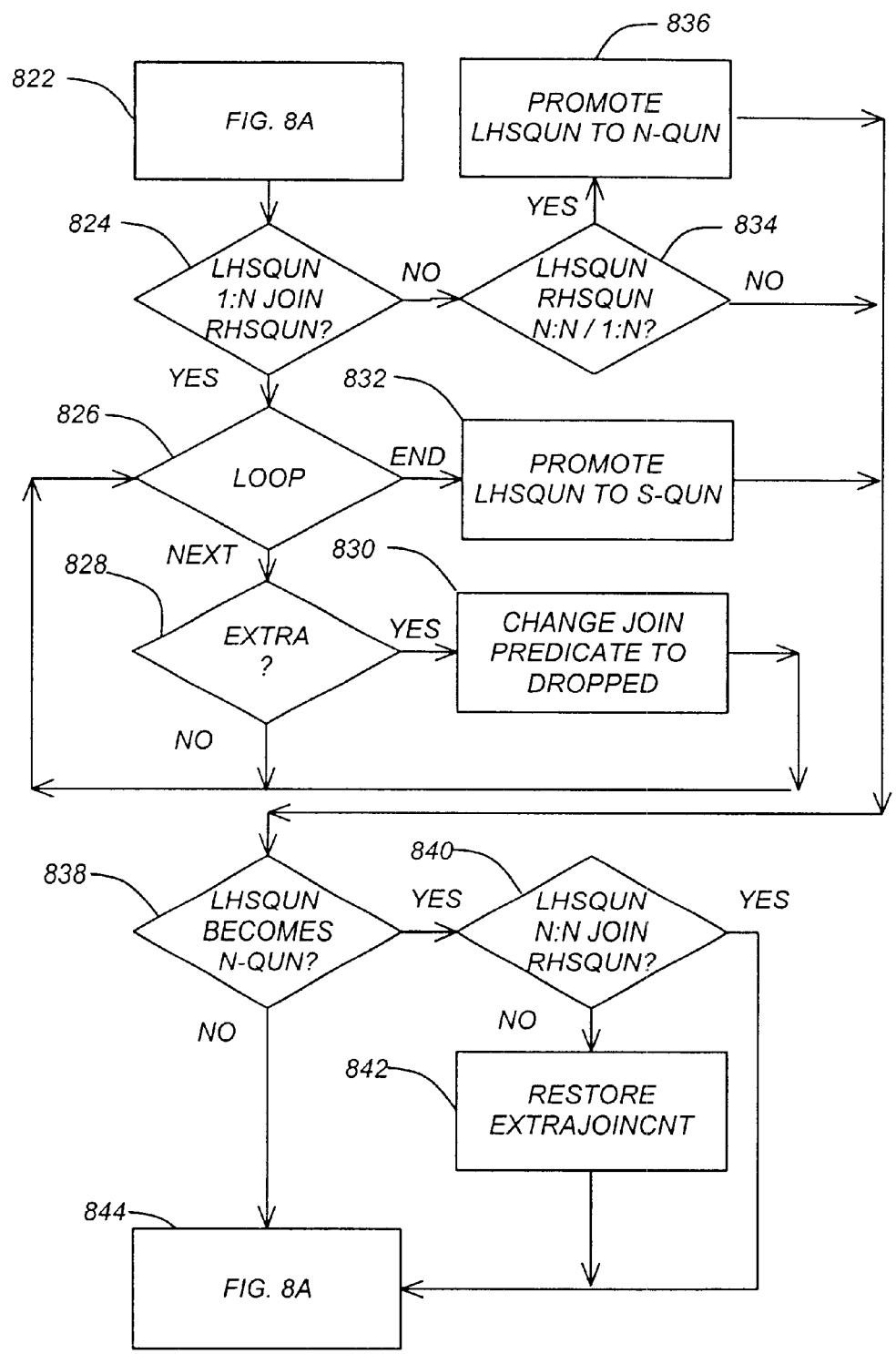

FIGS. 8A and 8B together are a flowchart that illustrates the logic of Step 3 of the 5 step process according to the preferred embodiment of the present invention.

Referring first to FIG. 8A, the flowchart is entered via Block 504 of FIG. 5.

Block 800 is a decision block that represents the method looping through the new N-qun's. For each execution of the loop, control then transfers to Block 802; upon completion of the loop, control transfers to Block 506 of FIG. 5.

Block 802 represents the method collecting predicates involved in the N-qun.

Block 804 is a decision block that represents the method looping through each quantifier (i.e., collected predicate) joined with the new N-qun. For each execution of the loop, control then transfers to Block 806; upon completion of the loop, control returns to Block 800.

Block 806 represents the method setting RHSqun to N-qun and LHSqun to the joining quantifier (qun).

Block 808 represents the method making a copy of ExtrajoinCnt(s).

Block 810 is a decision block that represents the method looping through all join predicates between LHSqun and RHSqun. For each execution of the loop, control then transfers to Block 812; upon completion of the loop, control transfers to Block 822, which represents control transferring to FIG. 8B.

Block 812 is a decision block that represents the method determining whether the current predicate is an EXTRA join predicate that is unavoidable. If so, control transfers to Block 814; otherwise, control transfers to Block 820.

Block 814 represents the method changing the join type between LHSqun and RHSqun to N:N.

Block 816 represents the method promoting the LHSqun to N-qun.

Block 818 represents the method restoring ExtrajoinCnt(s) using the copy made in Block 800 above. Thereafter, control returns to Block 804.

Block 820 represents the method decrementing the corresponding ExtrajoinCnt. Thereafter, control returns to Block 804.

Referring next to FIG. 8B, control is transferred from Block 822 in FIG. 8A.

Block 824 is a decision block that represents the method determining whether LHSqun is a 1:N join with RHSqun. If so, control transfers to Block 826; otherwise, control transfers to Block 834.

Block 826 is a decision block that represents the method looping through all join predicates between LHSqun and RHSqun. For each execution of the loop, control then transfers to Block 828; upon completion of the loop, control transfers to Block 832.

Block 828 is a decision block that represents the method determining whether the join predicate is an EXTRA join predicate. If so, control transfers to Block 830; otherwise, control returns to Block 826.

Block 830 represents the method changing the join predicate type to DROPPED.

Block 832 represents the method promoting LHSqun (PS-qun) to S-qun.

Block 834 is a decision block that represents the method determining whether LHSqun and RHSqun are N:N or N:1 joins. If so, control transfers to Block 836, which promotes LHSqun (PS/S-qun) to N-qun; otherwise, control transfers to Block 838.

Block 838 is a decision block that represents the method determining whether LHSqun becomes N-qun. If so, control transfers to Block 840; otherwise, control transfers to Block 844, which represents control returning to FIG. 8A.

Block 840 is a decision block that represents the method determining whether LHSqun is not a N:N join with RHSqun. If so, control transfers to Block 842; otherwise, control transfers to Block 844.

Block 842 represents the method restoring ExtrajoinCnt(s) using the copy made above in Block 808.

Block 844 represents the method returning control to FIG. 8A.

2.4) Step 4—S-Processing

This portion of the method has two goals: (1) to confirm that all newly promoted S-qun are indeed S-qun, and (2) to propagate S-qun states to its adjoining PS-qun's. Again, it is assumed that the S-qun being processed is placed at LHS with its joining quantifier (a PS/S/N-qun) on RHS.

The only situation where a RHS quantifier is promoted from PS-qun to S-qun is when LHSqun is a S-qun, and the join is N:1, in which case any EXTRA join predicate is changed to DROPPED, and the RHSqun state is changed from PS to S. This results in S-qun propagation (See example 2.1). In any other situations, any S-qun (LHS/RHS) or PS-qun (RHS) will be promoted to N-qun (with any EXTRA join predicate becoming a real join predicate). Lastly, if no new N-qun is introduced by this step, then the partitioning method is completed; otherwise, Step 3—N-Processing described above is repeated.

Figure 9A:
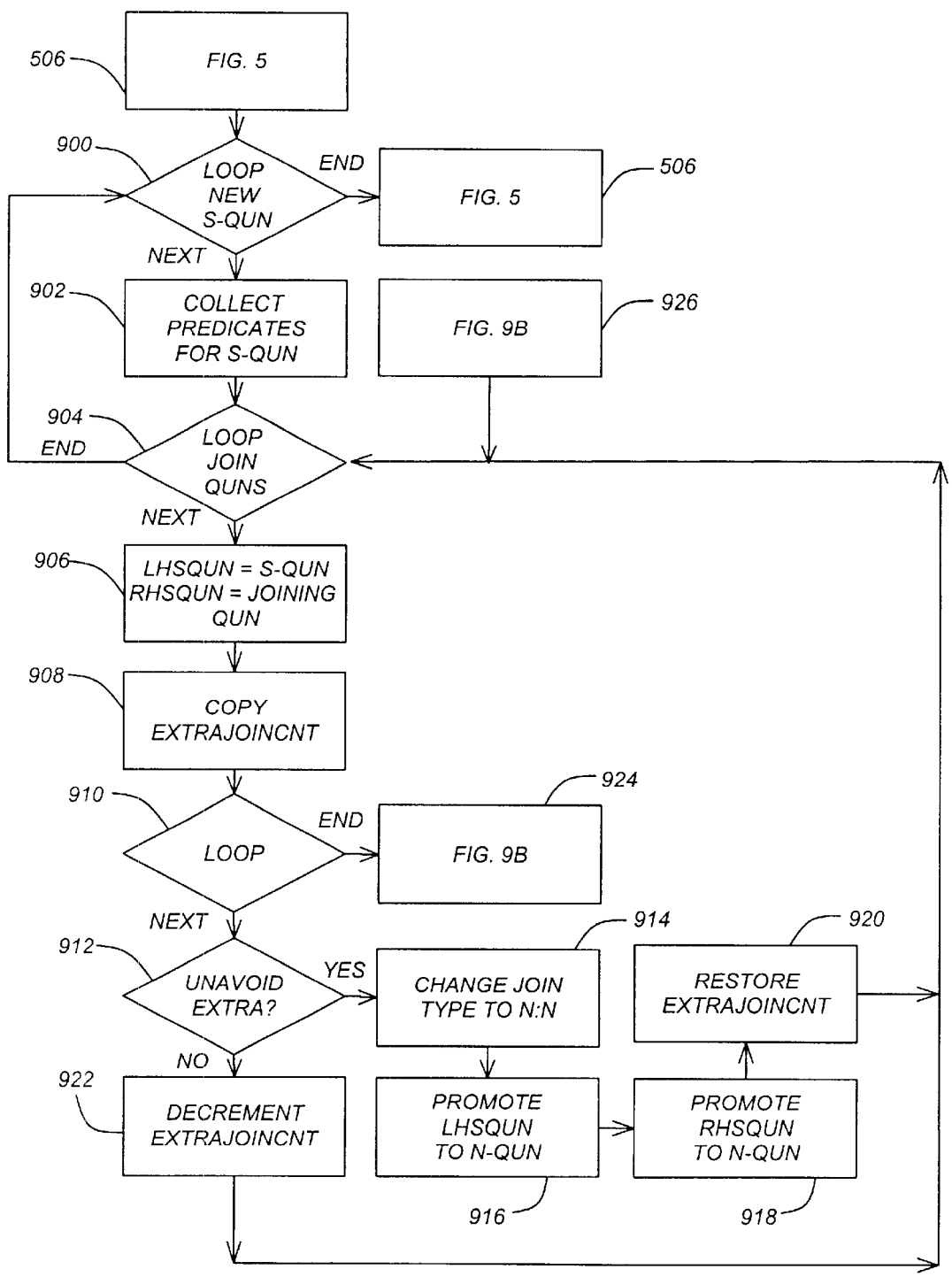
FIGS. 9A and 9B together are a flowchart that illustrates the logic of Step 4 of the 5 step process according to the preferred embodiment of the present invention.
Figure 9B:
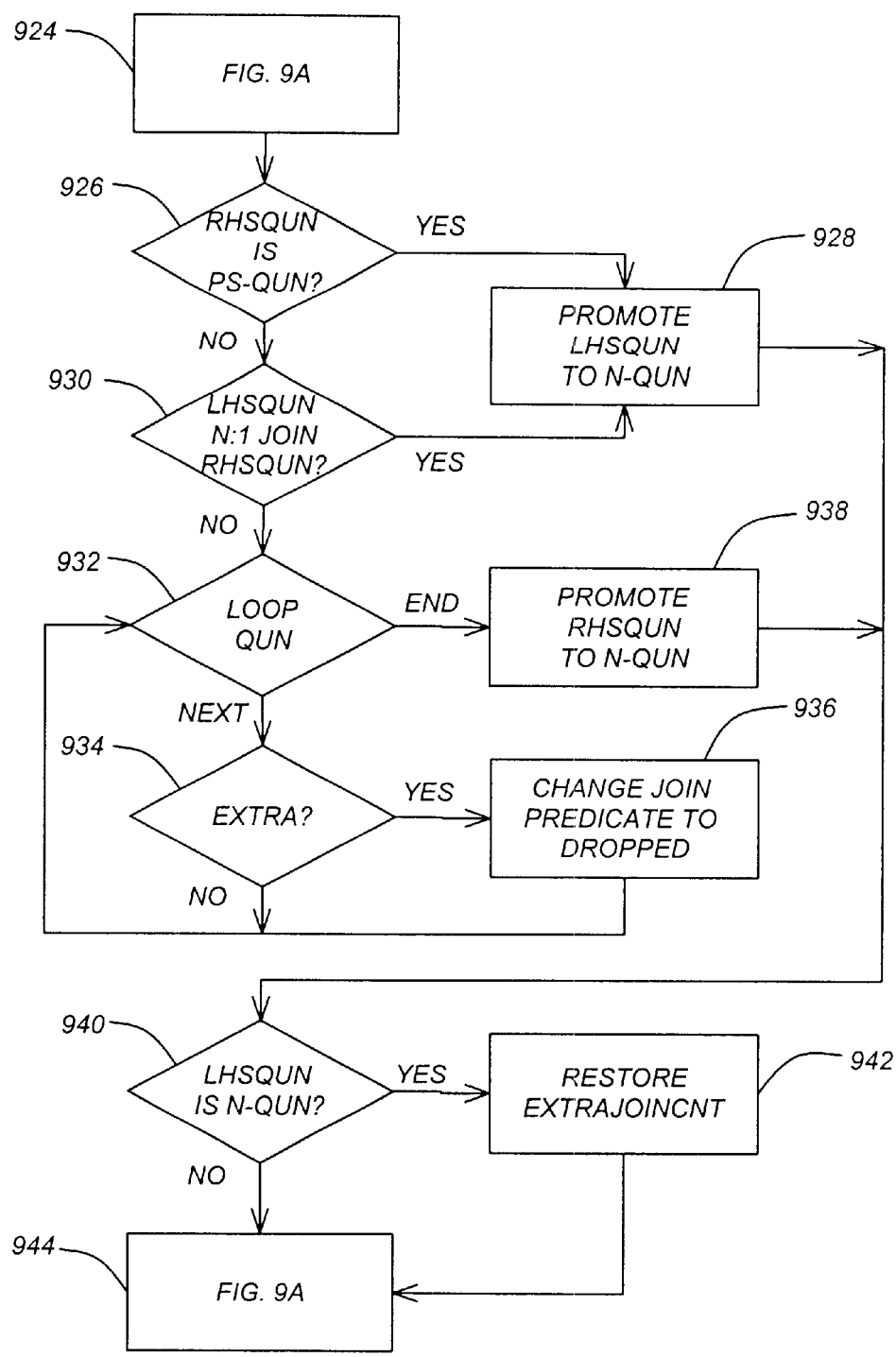

FIGS. 9A and 9B together are a flowchart that illustrates the logic of Step 4 of the 5 step process according to the preferred embodiment of the present invention.

The flowchart is entered via Block 506 of FIG. 5.

Block 900 is a decision block that represents the method looping through the new S-qun's. For each execution of the loop, control then transfers to Block 902; upon completion of the loop, control transfers to Block 508 of FIG. 5.

Block 902 represents the method collecting predicates involved in the S-qun.

Block 904 is a decision block that represents the method looping through each quantifier (i.e., collected predicate) joined with the new S-qun. For each execution of the loop, control then transfers to Block 906; upon completion of the loop, control returns to Block 900.

Block 906 represents the method setting LHSqun to S-qun and RHSqun to the joining quantifier (qun).

Block 908 represents the method making a copy of ExtrajoinCnt(s).

Block 910 is a decision block that represents the method looping through all join predicates between LHSqun and RHSqun. For each execution of the loop, control then transfers to Block 912; upon completion of the loop, control transfers to Block 924, which represents the method transferring control to FIG. 9B.

Block 912 is a decision block that represents the method determining whether the current predicate is an EXTRA join predicate that is unavoidable. If so, control transfers to Block 914; otherwise, control transfers to Block 922.

Block 914 represents the method changing the join type to N:N.

Block 916 represents the method promoting the LHSqun to N-qun.

Block 918 represents the method promoting the RHSqun to N-qun.

Block 920 represents the method restoring the ExtrajoinCnt(s) using the copy made above in Block 908. Thereafter, control returns to Block 904.

Block 922 represents the method decrementing the corresponding ExtrajoinCnt.

Thereafter, control returns to Block 904.

Referring next to FIG. 9B, control is transferred from Block 924 in FIG. 9A.

Block 926 is a decision block that represents the method determining whether RHSqun is a PS-qun. If so, control transfers to Block 928; otherwise, control transfers to Block 930.

Block 928 represents the method promoting LHSqun (PS-qun) to N-qun.

Block 930 is a decision block that represents the method determining whether LHSqun is N:1 joined with RHSqun. If so, control transfers to Block 928, which promotes LHSqun (PS/S-qun) to N-qun; otherwise, control transfers to Block 932.

Block 932 is a decision block that represents the method looping through all join predicates between LHSqun and RHSqun. For each execution of the loop, control then transfers to Block 934; upon completion of the loop, control transfers to Block 938.

Block 934 is a decision block that represents the method determining whether the join predicate is an EXTRA join predicate. If so, control transfers to Block 936; otherwise, control returns to Block 932.

Block 936 represents the method changing the join predicate type to DROPPED. Thereafter, control returns to Block 932.

Block 938 represents the method promoting RHSqun (PS-qun) to N-qun.

Block 940 is a decision block that represents the method determining whether LHSqun becomes N-qun. If so, control transfers to Block 942; otherwise, control transfers to Block 944, which represents control returning to FIG. 9A.

Block 942 represents the method restoring ExtrajoinCnt (s) using the copy made above in Block 908.

Block 944 represents the method returning control to FIG. 9A.

2.5) Step 5—Post-Processing

Figure 10:
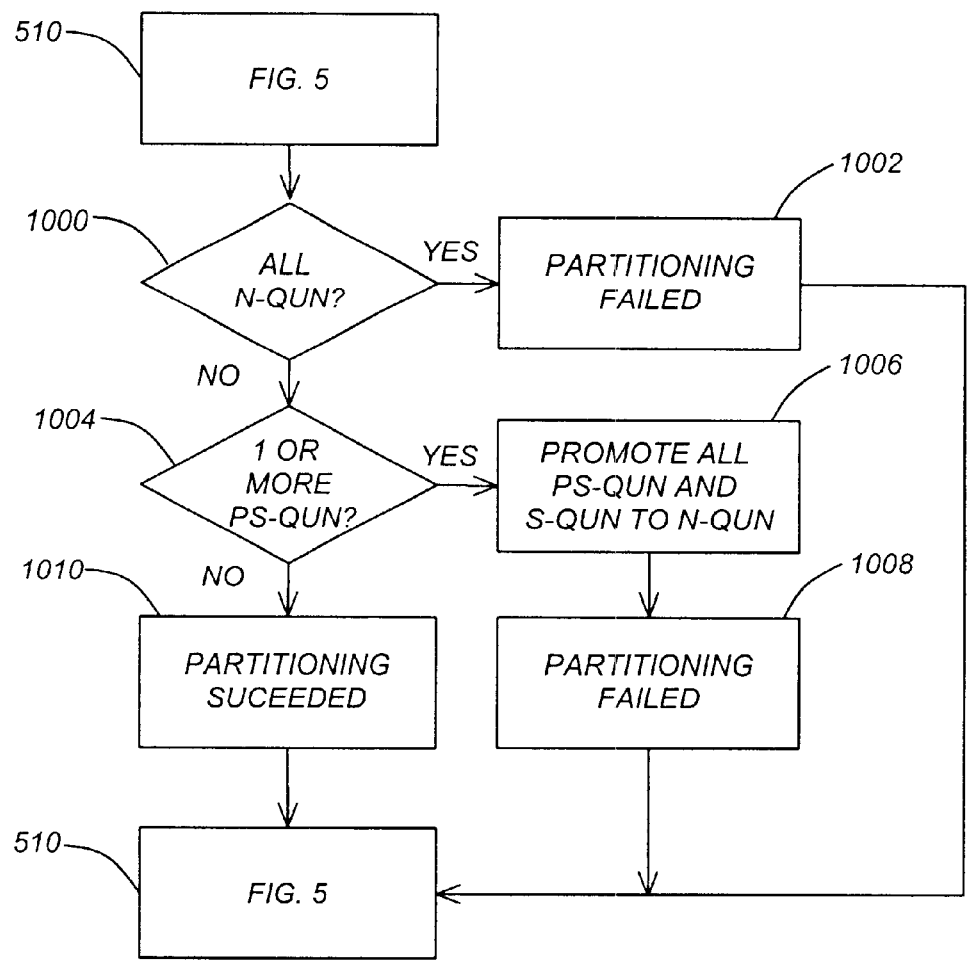
FIG. 10 is a flowchart that illustrates the logic of Step 5 of the 5 step process according to the preferred embodiment of the present invention.

FIG. 10 is a flowchart that illustrates the logic of Step 5 of the 5 step process according to the preferred embodiment of the present invention.

The flowchart is entered via Block 510 of FIG. 5.

Block 1000 is a decision block that represents the method determining whether all the quantifiers are N-qun. If so, then control transfers to Block 1002, which represents the method indicating that partitioning failed; otherwise, control transfers to Block 1004.

Block 1004 is a decision block that represents the method determining whether at least one quantifier is PS-qun. If so, then control transfers to Block 1006, which represents the method promoting all PS-qun and S-qun to N-qun, and Block 1008, which represents the method indicating that partitioning failed; otherwise, control transfers to Block 1010.

Block 1010 represents the method indicating that the partitioning is successful, and lossless quantifier(s) have been identified.

Block 510 represents the method returning to FIG. 5.

Figure 11:
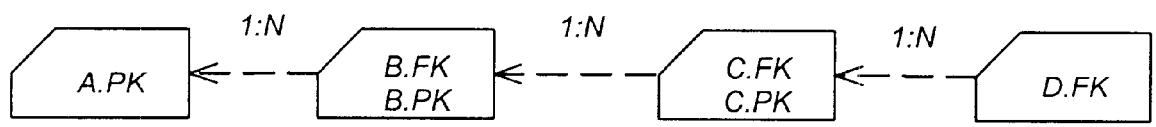
FIGS. 11, 12A, 12B, 12C, 13A, 13B, 14, 15, 16, and 17 are graphs that illustrate the relationships between predicates according to the preferred embodiment of the present invention.
Figure 12A:
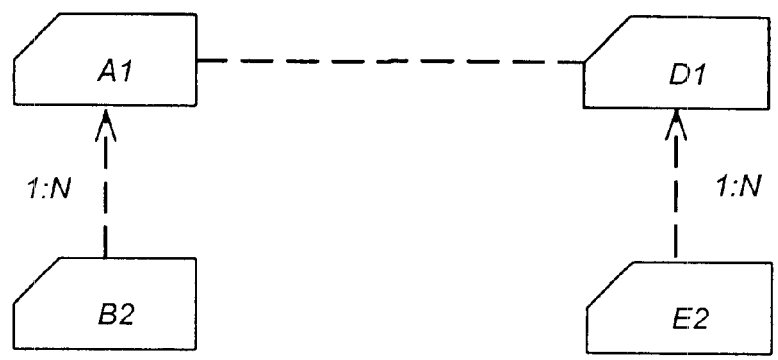
Figure 12B:
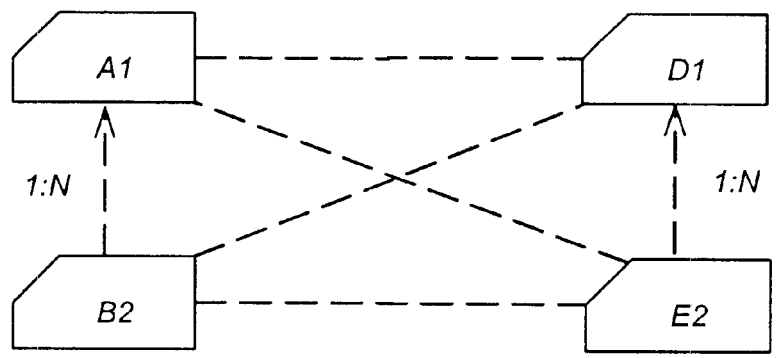

Example 2.1:

Consider the following example, wherein A, B, C, D are four PS-qun's, as described below:

CREATE TABLE A (
  PK INT NOT NULL,
  A2 INT NOT NULL,
  A3 INT NOT NULL,
  CONSTRAINT IA PRIMARY KEY (PK));
CREATE TABLE B (
  PK INT NOT NULL,
  FK INT NOT NULL,
  B3 INT NOT NULL,
  B4 INT NOT NULL,
  CONSTRAINT IB PRIMARY KEY (PK),
  FOREIGN KEY (FK) REFERENCES A);
CREATE TABLE C (
  PK INT NOT NULL,
  FK INT NOT NULL,
  C3 INT NOT NULL,
  C4 INT NOT NULL,
  CONSTRAINT IC PRIMARY KEY (PK),
  FOREIGN KEY (FK) REFERENCES B);

CREATE TABLE D (
　FK INT NOT NULL,
　D3 INT NOT NULL,
　D4 INT NOT NULL,
　FOREIGN KEY (OK) REFERENCES C);
The RI relationship is depicted in FIG. 11.
Consider the following set of join predicates:
　APK=B.FK and C.FK=B.PK and D.FK=C.PK
Using the partitioning method presented above, all five steps are listed below along with their corresponding results for this query:
Step 1: Preliminary Processing
Result:
　Not applicable.
Step 2: PS-Processing
Result:
　All joins were identified and promote quantifier D to N-qun, because D only joins with C and the join is N:1.
Step 3: N-Processing
Result:
　Process D: Promote C to S-qun and drop C.PK=D.FK, because C is 1:N joined with D.
Step 4: S-Processing
Result:
　Process C: Promote B to S-qun, because C is N:1 joined with B.
　Process B: Promote A to S-qun, because B is N:1 joined with A.
　No new N-qun's are introduced, so the partitioning is done.
Step 5: Post-Processing:
Result:
　Quantifiers A, B, and C are S-qun's, whereas D is N-qun. That is, tables A, B, and C are lossless tables, and thus they are eligible to be removed if none of their columns are referenced after the joins.
Example 2.2:
Consider the following example:
CREATE TABLE A (
　A1 INT NOT NULL,
　A2 INT NOT NULL,
　A3 INT NOT NULL,
　CONSTRAINT IA PRIMARY KEY (A1));
CREATE TABLE B (
　B1 INT NOT NULL,
　B2 INT NOT NULL,
　B3 INT NOT NULL,
　B4 INT NOT NULL,
　FOREIGN KEY (B2) REFERENCES A);
CREATE TABLE D (
　D1 INT NOT NULL,
　D2 INT NOT NULL,
　D3 INT NOT NULL,
　D4 INT NOT NULL,
　CONSTRAINT ID PRIMARY KEY (D1));
CREATE TABLE E(
　E1 FLOAT NOT NULL,
　E2 INT NOT NULL,
　E3 INT NOT NULL,
　FOREIGN KEY (E2) REFERENCES D);
Consider the following set of join predicates:
　A1=B2 and D1=E2 and A1=D1
FIG. 12A is a graph that illustrates the three join predicates and FIG. 12B is a graph that illustrates the complete set of join predicates: six join predicates with three implied join predicates via transitivity.

Figure 12C:
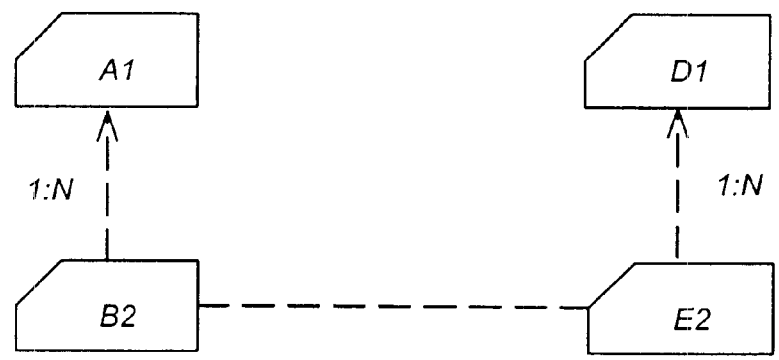

Using the partitioning method presented above, all five steps are listed below along with their corresponding results for this query.
Step 1: Preliminary processing
Result:
　Not applicable.
Step 2: PS-processing
Result:
　Promote B and E to N-qun's.
　Drop extra joins: A1=D1, A1=E2, D1=B2 (described in Section 3).
　FIG. 12C is a graph that illustrates this step.
Step 3: N-processing
Result:
　Promote A and D to S-qun's.
Step 4: Process S-qun
Result:
　Not applicable because all joins have been dropped.
　No new N-qun's are introduced, so the partitioning is done.
Step 5: Post-Processing
Result:
　Quantifiers A and D are S-qun's, whereas B and E are N-qun's.

Section 3) Extra Join Dilemma

Figure 13A:
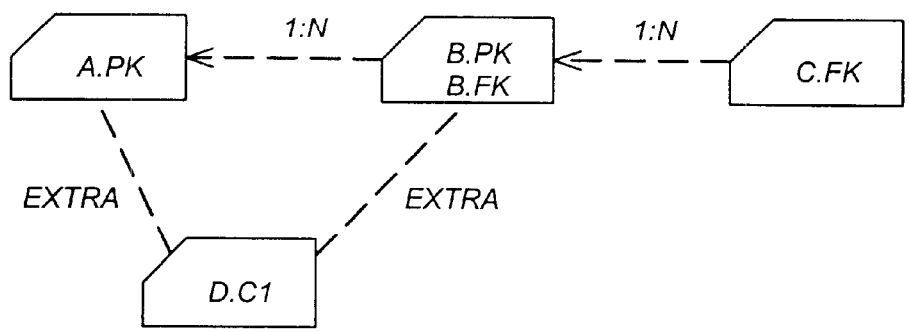
Figure 13B:
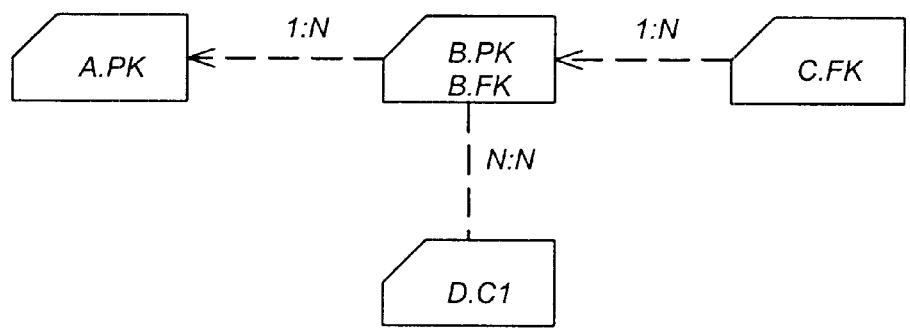

This section describes the extra join dilemma
Example 3.1
Consider the following tables:
CREATE TABLE A (
　PK INT NOT NULL PRIMARY KEY);
CREATE TABLE B (
　PK INT NOT NULL PRIMARY KEY,
　FK INT NOT NULL,
　FOREIGN KEY (FK) REFERENCES A);
CREATE TABLE C(
　FK INT NOT NULL,
　FOREIGN KEY (FK) REFERENCES B);
CREATE TABLE D (C1 INT NOT NULL);
Consider the following predicate set:
　A.PK=D.C1 and B.FK=D.C1 and B.PK=C.FK
With column transitivity, the predicate set becomes:
　A.PK=D.C1 and B.FK=D.C1 and A.PK=B.FK and B.PK=C.FK
Based on the technique presented above, there are two EXTRA joins (i.e., they are potentially avoidable lossy joins), and one implied join predicate via transitivity (i.e., ExtrajoinCnt is 1). The join diagram is depicted in FIG. 13A.
　Given that there is a choice of dropping either one of the two EXTRA joins (but not both), which EXTRA join should be dropped? During the final step of PS-processing, if (1) a quantifier (the LHSqun) remains to be a PS-qun (quantifier A in the above example), and (2) LHSqun has no RI join that references other quantifiers where LHSqun is the child table (i.e., no LHSqun joining with RHSqun such that the join is N:1), and (3) LHSqun does have extra joins and the corresponding ExtrajoinCnt(s) are available, then drop all extra joins associated with LHSqun.
　In example 3.1, the extra join A.PK=D.C1 is dropped and the graph is reduced to FIG. 13B. Note that D.C1=B.FK has been changed from EXTRA join to N:N join. The partitioning result is that quantifiers B, C, D are N-qun's, and A is S-qun. Had the other join between B and D be dropped, then all quantifiers will be N-qun's, i.e., no lossless join is identified.

4) Special "FK is PK" Check

A special check for quantifiers involved in column transitive closure with at least one quantifier has more than one dependent. Consider the following examples, which are used to illustrate the problem and opportunity for further optimization.

Example 4.1

Consider the following tables:

CREATE TABLE A (PK INT NOT NULL PRIMARY KEY);
CREATE TABLE B (
  PK INT NOT NULL PRIMARY KEY,
  FK INT NOT NULL,
  FOREIGN KEY (FK) REFERENCES A);
CREATE TABLE C (
  FK INT NOT NULL,
  FOREIGN KEY (FK) REFERENCES A,
  FOREIGN KEY (FK) REFERENCES B);

Consider the following join graph and join condition:

C.FK=A.PK and A.PK=B.FK

Figure 14:
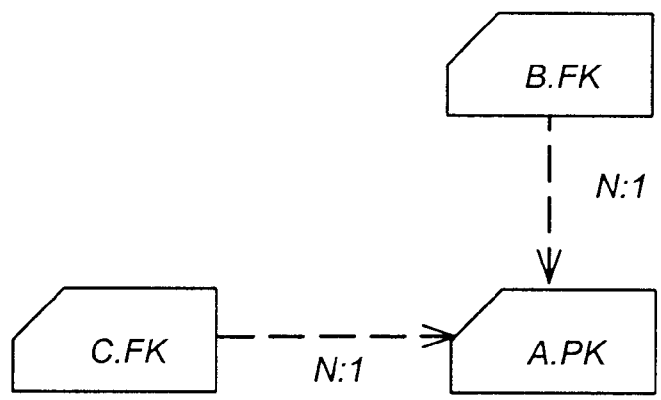

This is illustrated in FIG. 14. Only A will be considered as a lossless table because there is a lossy implied join C.FK=B.FK, which ensures that any row from C joining B must have a matching parent row in A.

Example 4.2

Figure 15:
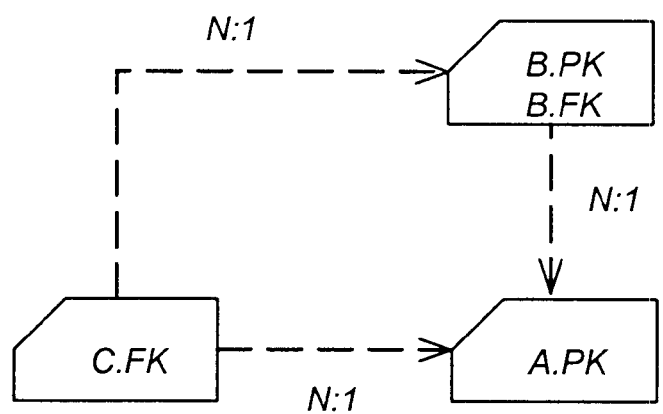

Next, consider a slightly more complicated example shown in FIG. 15. The original predicate set is:

C.FK=A.PK and C.FK=B.PK and B.FK=A.PK

With column transitivity, the join condition is:

C.FK=A.PK and C.FK=B.PK and B.FK=A.PK
and B.PK=A.PK and C.FK=B.FK
and B.PK=B.FK

Quantifier C must be N-qun because C is N:1 joined with A and N:1 joined with B. Quantifier B is also a N-qun as the implied join B.FK=C.FK is lossy because B.PK and B.FK are disjoint. Quantifier A is the only lossless table. Consider the following data examples, which illustrate this point:

C(FK)
1

A(PK)
1
2

B(PK,FK)
1,2

In this example, table C has one row, table A has two rows and table B has one row. The join will produce no rows, even though all RIs are satisfied. Row C (1) will match one row in B (1,2) which will match one row in A (2), but the same row C (1) via C.FK=A.PK will not match the same row in A (1 instead of 2). Therefore, the join will produce no rows. Both B and C must be N-qun's. In this case, the join between B and C will still produce no rows, because there is an implied join between B.FK and B.PK. In a sense, there is a lossy join between B.PK and B.FK.

Example 4.3

Consider the following tables:

CREATE TABLE A (PK INT NOT NULL PRIMARY KEY);
CREATE TABLE B(
  PKFK INT NOT NULL PRIMARY KEY,
  FOREIGN KEY (PKFK) REFERENCES A);
CREATE TABLE C (
  FK INT NOT NULL,
  FOREIGN KEY (FK) REFERENCES A,
  FOREIGN KEY (FK) REFERENCES B);

Consider the following predicate set:

C.FK=A.PK and B.PKFK=A.PK

Figure 16:
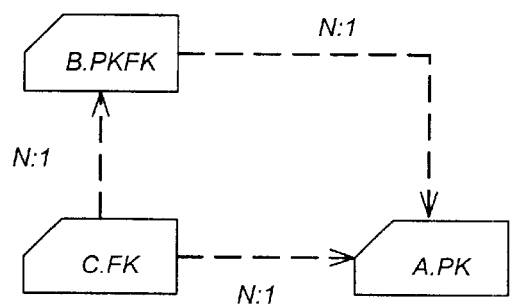

The example of FIG. 16 illustrates the simple idea of the property of "FK is PK". In total, there are three join predicates, but one of them is an implied join predicate via transitivity. In this example, only C is N-qun because C.FK restricted the value of B's foreign key (B.PKFK) which is also the primary key of B. Here, quantifier B is not a N-qun, because it has the property of "FK is PK". Note that "FK is PK" means all key parts of the foreign key constitutes the primary key of the table.

Foreign key that contains the primary key (e.g., FK={C1, C2} contains PK={C2}) does not qualify.

The order of key parts is important (i.e., FK={C1,C2} and PK={C2,C1} does not qualify.)

That is, the foreign key is identical as the primary key. Only C is a N-qun, and both A and B are S-qun meaning that both A and B are eligible for elimination.

Example 4.4

Figure 17:
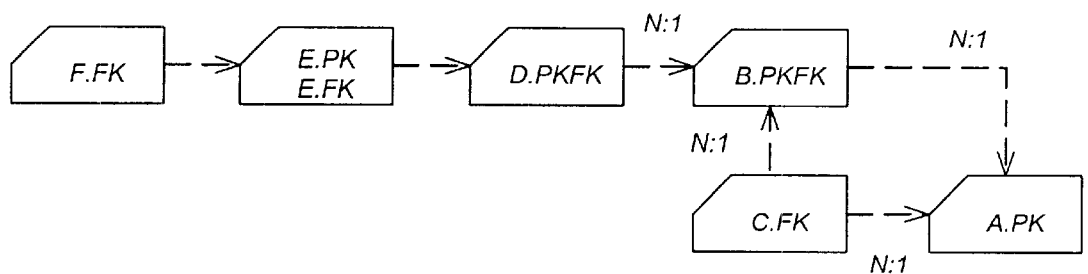

Consider the following tables:

CREATE TABLE A (PK INT NOT NULL PRIMARY KEY);
CREATE TABLE B (
  PKFK INT NOT NULL PRIMARY KEY,
  FOREIGN KEY (PKFK) REFERENCES A);
CREATE TABLE C (
  FK INT NOT NULL,
  FOREIGN KEY (FK) REFERENCES A,
  FOREIGN KEY (FK) REFERENCES B);
CREATE TABLE D (
  PKFK INT NOT NULL,
  FOREIGN KEY (PKFK) REFERENCES B);
CREATE TABLE E(
  PK INT NOT NULL PRIMARY KEY,
  FK INT NOT NULL,
  FOREIGN KEY (FK) REFERENCES D);
CREATE TABLE F(
  FK INT NOT NULL,
  FOREIGN KEY (FK) REFERENCES E);

This example illustrates the propagative nature of "FK is PK" feature in optimally partitioning the quantifiers. The join condition is:

F.FK=E.PK and E.FK=D.PKFK and D.PKFK=B.PKFK
B.PKFK=C.FK and C.FK=A.PK and B.PKFK=A.PK FIG. 17 illustrates this example. Quantifiers C, E and F are N-qun's. Quantifier E is a N-qun because the implied join E.FK=C.FK is lossy. Quantifier D does not need to be a N-qun even though D.PKFK=C.FK and D.PKFK=A.PK are not RI joins, because the implied join E.FK=C.PK has already restricted the value of D.PKFK to be equal to C.FK.

Remember that there is a RI between E and D. If there was not such an RI, then D must be lossy. The result is that quantifiers A, B, and D are S-qun's, whereas quantifiers C, E and F are N-qun's. To support this optimization technique, the PS-processing step is enhanced as follows.

During PS-processing, when a quantifier has been identified to be the parent of more than one quantifier, then the method "walks" down to each of its descendents.

If the descendant's FK is PK, then the method extends the check down this branch (i.e., to the descendant's descendents.)

If the descendant's FK is not PK, then the method promotes the descendent to N-qun and discontinues extending the check down this branch.

If the descendent is already a N-qun, then the method discontinues extending the search down this branch.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. Moreover, many types of databases could benefit from the present invention. In addition, any software program performing join operations (or their equivalent) could benefit from the present invention.

In summary, the present invention discloses a method, apparatus, and article of manufacture for optimizing a query being performed by a computer system to retrieve data from a database stored on the computer system. The query is analyzed to identify any joins therein that are lossless and to identify any tables of the identified joins that are eligible for removal. This analysis includes partitioning the joins into lossless and lossy joins, and partitioning the tables of the joins according to their associated quantifiers, wherein each of the quantifiers has a quantifier state indicating whether the table participates in a join that is lossless. The query is then rewritten to eliminate the identified tables that are eligible for removal.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A method of optimizing a query in a computer system, the query being performed by the computer system to retrieve data from a database stored on the computer system, the method comprising the steps of:
   (a) analyzing the query in the computer system to identify any joins therein that are lossless by partitioning the joins into lossless and lossy joins, and to identify any tables of the identified joins that are eligible for removal, wherein the partitioning step comprises partitioning the tables of the joins according to their associated quantifiers, each of the quantifiers has a quantifier state indicating whether the table participates in a join that is lossless, and the quantifier states are selected from a group comprising: a PS state indicating a potentially single state, a S state indicating a single state, and an N state indicating a lossy state; and
   (b) rewriting the query in the computer system to eliminate the identified tables.

2. The method of claim 1, further comprising executing the rewritten query in the computer system to retrieve data from the database stored on the computer system.

3. The method of claim 1, wherein the table is eligible for removal if it is a parent table and if its columns are not selected in the identified join.

4. The method of claim 3, wherein the identified joins do not reduce a number of rows retrieved from child tables.

5. The method of claim 1, wherein the PS state is a lowest state and the N state is a highest state.

6. The method of claim 1, wherein the quantifiers begin at the PS state.

7. The method of claim 1, wherein the quantifiers are promoted from a lower state to a higher state and the quantifiers are never demoted from a higher level state to a lower level state.

8. The method of claim 1, wherein the partitioning step considers a full set of column equivalent predicates.

9. The method of claim 8, wherein the column equivalent predicates comprise column transitivity predicates.

10. The method of claim 1, wherein the partitioning step considers implied join predicates.

11. The method of claim 1, wherein the joins include at least one join predicate that is selected from a group comprising an extra predicate, a dropped predicate, and a clean predicate.

12. The method of claim 11, wherein the extra predicate is not a referential integrity join predicate and need not be applied by the partitioning step.

13. The method of claim 11, wherein the dropped predicate is a join predicate that has been removed from future consideration by the partitioning step.

14. The method of claim 11, Wherein the clean predicate is a referential integrity join predicate.

15. The method of claim 11, wherein the clean predicate is a join predicate that cannot be avoided by the partitioning step.

16. The method of claim 11, wherein a join type between two tables is selected from a group comprising a 1:N join type, a N:1 join tape, a N:N join type, and an extra join type.

17. The method of claim 16, wherein the 1:N join type indicates that the query must contain all referential integrity join predicates that form a referential integrity relationship between a parent table and a child table, extra and dropped predicates are allowed between the parent and child tables, and the parent table is lossless.

18. The method of claim 16, wherein the N:1 join type indicates that the query must contain all referential integrity join predicates that form a referential integrity relationship between a parent table and a child table, extra and dropped predicates are allowed between the parent and child tables, and the child table is lossless.

19. The method of claim 16, wherein the N:N join type indicates that the query contains at least one lossy join predicate that must be applied by the partitioning step.

20. The method of claim 16, wherein the extra join type indicates that the query must contain only extra and dropped join predicates, wherein the extra join is a lossy join that may be avoidable by the partitioning step.

21. The method of claim 1, wherein the analyzing step comprises:
   (1) performing a preliminary processing step that filters out quantifiers by promoting the quantifiers to the N state that are ineligible to be the S state;
   (2) performing a PS-processing step that processes quantifiers that are the PS state;
   (3) performing a N-processing step that processes only those quantifiers that are newly promoted to the N state;
   (4) performing a S-processing step that confirms that all quantifiers that are newly promoted to the S state are the S state, and that propagates adjoining quantifiers that are the PS state to the S state;
   (5) performing a post-processing step that indicates that the partitioning step: (1) failed, if all the quantifiers are the N state, (2) failed, if at least one quantifier is the PS state; and (3) succeeded, for all other situations.

22. The method of claim 21, wherein the preliminary processing step comprises filtering out the quantifiers that are involved in a non-column equivalent predicate.

23. The method of claim 21, wherein the preliminary processing step comprises filtering out the quantifiers that are involved in a local predicate.

24. The method of claim 21, wherein the PS-processing step comprises, for each quantifier that is the PS state, determining the join types of all joins that involve the quantifier and determining whether the quantifier should be promoted to the N state.

25. The method of claim 21, wherein the state of each quantifier must be either the PS or N states before performing the PS-processing step.

26. The method of claim 21, wherein the PS-processing step further comprises determining all the joins that involve quantifiers that are the PS state, and
- if no join involves an isolated quantifier that is the PS state, then promoting the quantifier to the N state,
- if a left-hand side quantifier has at least one unavoidable lossy join of the N:N join type, then promoting the left-hand side quantifier and the other N:N joined quantifiers to the N state,
- if a left-hand side quantifier has at least one N:1 join type and the rest of the quantifiers are extra joins, then promoting the left-hand side quantifier to the N state,
- if a left-hand side quantifier has more than one 1:N join typo and the rest of the quantifiers are extra joins, then performing a "foreign key is primary key" check,
- if a left-hand side quantifier is 1:N joined with a right-hand side quantifier and the foreign key of the right-hand side quantifier has nullable key columns, then promoting the right-hand side quantifier to the N state,
- otherwise, letting the left-hand side quantifier remain in the PS state.

27. The method of claim 21, wherein the N-processing step further comprises determining wherein all quantifiers that are 1:N, N:1, or N:N joined with the quantifier at the N state.

28. The method of claim 21, wherein the N-processing step further comprises removing all joins that are processed during the N-processing step from future consideration.

29. The method of claim 21, wherein the N-processing step further comprises placing the quantifier having the N state being processed at the right-hand side of the join with its joining quantifier on the left-hand side.

30. The method of claim 21, wherein the N-processing step further comprises, if the left-hand side quantifier is already a N-qun, then removing all join predicates as if processed and moving on to a new left-hand side quantifier.

31. The method of claim 21, wherein the S-processing step further comprises promoting a right-hand side quantifier from PS-qun to S-qun when left-hand side quantifier is S-qun, right-hand side quantifier is PS-qun, and the join is N:1.

32. The method of claim 21, wherein the S-processing step further comprises changing an extra join to a dropped join and changing the state of the right-hand side quantifier from PS to S.

33. The method of claim 21, wherein the S-processing step further comprises promoting any quantifiers at the S (left- or right-hand side) or PS (right-hand side only) states to the N state.

34. The method of claim 21, wherein the S-processing step further comprises indicating that the partitioning step is completed if no new quantifiers at the N state are introduced by the S-processing step.

35. The method of claim 21, wherein the post-processing step further comprises:
- if all the quantifiers are the N state, indicating that the partitioning step failed,
- if at least one quantifier is the PS state, then promoting all the quantifiers at the PS and S states to the N state, and indicating that the partitioning step failed,
- otherwise, indicating that the partitioning step was successful.

36. An apparatus for optimizing a query, comprising
(a) a computer;
(a) means, executed by the computer, for analyzing the query in the computer to identify any joins therein that are lossless by a means for partitioning the joins into lossless and lossy joins, and to identify any tables of the identified joins that are eligible for removal, wherein the means for partitioning comprises means for partitioning the tables of the joins according to their associated quantifiers, each of the quantifiers has a quantifier state indicating whether the table participates in a join that is lossless, and the quantifier states are selected from a group comprising: a PS state a potentially single state, a S state indicating a single state, and an N state indicating a lossy state; and
(b) means, executed by the computer, for rewriting the query in the computer system to eliminate the identified tables.

37. The apparatus of claim 36, further comprising means for executing the rewritten query to retrieve data from a database.

38. The apparatus of claim 36, wherein the table is eligible for removal if it is a parent table and if its columns are not selected in the identified join.

39. The apparatus of claim 38, wherein the identified joins do not reduce a number of rows retrieved from child tables.

40. The apparatus of claim 36, wherein the PS state is a lowest state and the N state is a highest state.

41. The apparatus of claim 36, wherein the quantifiers begin at the PS state.

42. The apparatus of claim 36, wherein the quantifiers are promoted from a lower state to a higher state and the quantifiers are never demoted from a higher level state to a lower level state.

43. The apparatus of claim 36, wherein the means for partitioning considers a full set of column equivalent predicates.

44. The apparatus of claim 43, wherein the column equivalent predicates comprise column transitivity predicates.

45. The apparatus of claim 36, wherein the means for partitioning considers implied join predicates.

46. The apparatus of claim 36, wherein the joins include at least one join predicate that is selected from a group comprising an extra predicate, a dropped predicate, and a clean predicate.

47. The apparatus of claim 46, wherein the extra predicate is not a referential integrity join predicate and need not be applied by the means for partitioning.

48. The apparatus of claim 46, wherein the dropped predicate is a join predicate that has been removed from future consideration by the means for partitioning.

49. The apparatus of claim 46, wherein the clean predicate is a referential integrity join predicate.

50. The apparatus of claim 46, wherein the clean predicate is a join predicate that cannot be avoided by the means for partitioning.

51. The apparatus of claim 46, wherein a join type between two tables is selected from a group comprising a 1:N join type, a N:1 join type, a N:N join type, and an extra join type.

52. The apparatus of claim 51, wherein the 1:N join type indicates that the query must contain all referential integrity join predicates that form a referential integrity relationship between a parent table and a child table, extra and dropped predicates are allowed between the parent and child tables, and the parent table is lossless.

53. The apparatus of claim 51, wherein the N:1 Join type indicates that the query must contain all referential integrity join predicates that form a referential integrity relationship between a parent table and a child table, extra and dropped predicates are allowed between the parent and child tables, and the child table is lossless.

54. The apparatus of claim 51, wherein the N:N join type indicates that the query contains at least one lossy join predicate that must be applied by the means for partitioning.

55. The apparatus of claim 51, wherein the extra join type indicates that the query must contain only extra and dropped join predicates, wherein the extra join is a lossy join that may be avoidable by the means for partitioning.

56. The apparatus of claim 36, wherein the means for analyzing comprises:
  (1) means for performing a preliminary processing step that filters out quantifiers by promoting the quantifiers to the N state that are ineligible to be the S state;
  (2) means for performing a PS-processing step that processes quantifiers that are the PS state;
  (3) means for performing a N-processing step that processes only those quantifiers that are newly promoted to the N state;
  (4) means for performing a S-processing step that confirms that all quantifiers that are newly promoted to the S state are the S state, and that propagates adjoining quantifiers that are the PS state to the S state;
  (5) means for performing a post-processing step that indicates that the means for partitioning: (1) failed, if all the quantifiers are the N state, (2) failed, if at least one quantifier is the PS state; and (3) succeeded, for all other situations.

57. The apparatus of claim 56, wherein the means for performing a preliminary processing step comprises means for filtering out the quantifiers that are involved in a non-column equivalent predicate.

58. The apparatus of claim 56, wherein the means for preliminary processing step comprises means for filtering out the quantifiers that are involved in a local predicate.

59. The apparatus of claim 56, wherein the means for PS-processing step comprises, for each quantifier that is the PS state, means for determining the join types of all joins that involve the quantifier and determining whether the quantifier should be promoted to the N state.

60. The apparatus of claim 56, wherein the state of each quantifier must be either the PS or N states before performing the means for PS-processing step.

61. The apparatus of claim 56, wherein the means for PS-processing step further comprises means for determining all the joins that involve quantifiers that are the PS state, and
  if no join involves an isolated quantifier that is the PS state, then promoting the quantifier to the N state, if a left-hand side quantifier has at least one unavoidable lossy join of the N:N join type, then promoting the left-hand side quantifier and the other N:N joined quantifiers to the N state,
  if a left-hand side quantifier has at least one N:1 join type and the rest of the quantifiers are extra joins, then promoting the left-hand side quantifier to the N state,
  if a left-hand side quantifier has more than one 1:N join type and the rest of the quantifiers are extra joins, then performing a "foreign key is primary key" check,
  if a left-hand side quantifier is 1:N joined with a right-hand side quantifier and the foreign key of the right-hand side quantifier has nullable key columns, then promoting the right-hand side quantifier to the N state, otherwise, letting the left-hand side quantifier remain in the PS state.

62. The apparatus of claim 56, wherein the means for N-processing step further comprises means for determining wherein all quantifiers that are 1:N, N:1, or N:N joined with the quantifier at the N state.

63. The apparatus of claim 56, wherein the means for N-processing step farther comprises means for removing all joins that are processed during the means for N-processing step from future consideration.

64. The apparatus of claim 56, wherein the means for N-processing step further comprises means for placing the quantifier having the N state being processed at the right-hand side of the join with its joining quantifier on the left-hand side.

65. The apparatus of claim 56, wherein the means for N-processing step further comprises, if the left-hand side quantifier is already a N-qun, means for removing all join predicates as if processed and for moving on to a new left-hand side quantifier.

66. The apparatus of claim 56, wherein the means for S-processing step further comprises means for promoting a right-hand side quantifier from PS-qun to S-qun when left-hand side quantifier is S-qun, the right-hand side quantifier is PS-qun, and the join is N:1.

67. The apparatus of claim 56, wherein the means for S-processing step further comprises means for changing an extra join to a dropped join and for changing the state of the right-hand side quantifier from PS to S.

68. The apparatus of claim 56, wherein the means for S-processing step further comprises means for promoting any quantifiers at the S (left- or right-hand side) or PS (right-hand side only) states to the N state.

69. The apparatus of claim 56, wherein the means for S-processing step further comprises means for indicating that the means for partitioning is completed if no new quantifiers at the N state are introduced by the means for S-processing step.

70. The apparatus of claim 56, wherein the means for post-processing step further comprises:
  if all the quantifiers are the N state, means for indicating that the means for partitioning failed,
  if at least one quantifier is the PS state, means for promoting all the quantifiers at the PS and S states to the N state, and for indicating that the means for partitioning failed,
  otherwise, means for indicating that the means for partitioning was successful.

71. An article of manufacture embodying logic for performing a method of optimizing a query in a computer system, the query being performed by the computer system to retrieve data from a database stored on the computer system, the method comprising the steps of:
  (a) analyzing the query in the computer system to identify any joins therein that are lossless by partitioning the joins into lossless and lossy joins, and to identify any tables of the identified joins that are eligible for removal, wherein the partitioning step comprises partitioning the tables of the joins according to their associated quantifiers, each of the quantifiers has a quantifier state indicating whether the table participates in a join that is lossless, and the quantifier states are selected from a group comprising: a PS state indicating a potentially single state, a S state indicating a single state, and an N state indicating a lossy state; and (b) rewriting the query in the computer system to eliminate the identified tables.

72. The method of claim 71, further comprising executing the rewritten query in the computer system to retrieve data from the database stored on the computer system.

73. The method of claim 71, wherein the table is eligible for removal if it is a parent table and if its columns are not selected in the identified join.

74. The method of claim 71, wherein the identified joins do not reduce a number of rows retrieved from child tables.

75. The method of claim 71, wherein the PS state is a lowest state and the N state is a highest state.

76. The method of claim 71, wherein the quantifiers begin at the PS state.

77. The method of claim 71, wherein the quantifiers are promoted from a lower state to a higher state and the quantifiers are never demoted from a higher level state to a lower level state.

78. The method of claim 71, wherein the partitioning step considers a full set of column equivalent predicates.

79. The method of claim 78, wherein the column equivalent predicates comprise column transitivity predicates.

80. The method of claim 71, wherein the partitioning step considers implied join predicates.

81. The method of claim 71, wherein the joins include at least one join predicate that is selected from a group comprising an extra predicate, a dropped predicate, and a clean predicate.

82. The method of claim 81, wherein the extra predicate is not a referential integrity join predicate and need not be applied by the partitioning step.

83. The method of claim 81, wherein the dropped predicate is a join predicate that has been removed from future consideration by the partitioning step.

84. The method of claim 81, wherein the clean predicate is a referential integrity join predicate.

85. The method of claim 81, wherein the clean predicate is a join predicate that cannot be avoided by the partitioning step.

86. The method of claim 81, wherein a join type between two tables is selected from a group comprising a 1:N join type, a N:1 join type, a N:N join type, and an extra join type.

87. The method of claim 86, wherein the 1:N join tape indicates that the query must contain all referential integrity join predicates that form a referential integrity relationship between a parent table and a child table, extra and dropped predicates are allowed between the parent and child tables, and the parent table is lossless.

88. The method of claim 86, wherein the N:1 join type indicates that the query must contain all referential integrity join predicates that form a referential integrity relationship between a parent table and a child table, extra and dropped predicates are allowed between the parent and child tables, and the child table is lossless.

89. The method of claim 86, wherein the N:N join type indicates that the query contains at least one lossy join predicate that must be applied by the partitioning step.

90. The method of claim 86, wherein the extra join type indicates that the query must contain only extra and dropped join predicates, wherein the extra join is a lossy join that may be avoidable by the partitioning step.

91. The method of claim 71, wherein the analyzing step comprises:

(1) performing a preliminary processing step that filters out quantifiers by promoting the quantifiers to the N state that are ineligible to be the S state;

(2) performing a PS-processing step that processes quantifiers that are the PS state;

(3) performing a N-processing step that processes only those quantifiers that are newly promoted to the N state;

(4) performing a S-processing step that confirms that all quantifiers that are newly promoted to the S state are the S state, and that propagates adjoining quantifiers that are the PS state to the S state;

(5) performing a post-processing step that indicates that the partitioning step (1) failed, if all the quantifiers are the N state, (2) failed, if at least one quantifier is the PS state, and (3) succeeded, for all other situations.

92. The method of claim 91, wherein the preliminary processing step comprises filtering out the quantifiers that are involved in a non-column equivalent predicate.

93. The method of claim 91, wherein the preliminary processing step comprises filtering out the quantifiers that are involved in a local predicate.

94. The method of claim 91, wherein the PS-processing step comprises, for each quantifier that is the PS state, determining the join types of all joins that involve the quantifier and determining whether the quantifier should be promoted to the N state.

95. The method of claim 91, wherein the state of each quantifier must be either the PS or N states before performing the PS-processing step.

96. The method of claim 91, wherein the PS-processing step further comprises determining all the joins that involve quantifiers that are the PS state, and if no join involves an isolated quantifier that is the PS state, then promoting the quantifier to the N state, if a left-hand quantifier has at least one unavoidable lossy join of the N:N join type, then promoting the left-hand quantifier and the other N:N joined quantifiers to the N state, if a left-hand quantifier has at least one N:1 join type and the rest of the quantifiers are extra joins, then promoting the left-hand side quantifier to the N state, if a left-hand side quantifier has more than one 1:N join type and the rest of the quantifiers are extra joins, then performing a "foreign key is primary key" check, if a left-hand side quantifier is 1:N joined with a right-hand side quantifier and the foreign key of the right-hand side quantifier has nullable key columns, then promoting the right-hand side quantifier to the N state, otherwise, letting the left-hand side quantifier remain in the PS state.

97. The method of claim 91, wherein the N-processing step further comprises determining wherein all quantifiers that are 1:N, N:1, or N:N joined with the,quantifier at the N state.

98. The method of claim 91, wherein the N-processing step further comprises removing all joins that are processed during the N-processing step from future consideration.

99. The method of claim 91, wherein the N-processing step further comprises placing the quantifier having the N state being processed at the right-hand side of the join with its joining quantifier on the left-hand side.

100. The method of claim 91, wherein the N-processing step further comprises, if the left-hand side quantifier is already a N-qun, then removing all join predicates as if processed and moving on to a new left-hand side quantifier.

101. The method of claim 91, wherein the S-processing step further comprises promoting a right-hand side quantifier from PS-qun to S-qun when left-hand side quantifier is S-qun, right-hand side quantifier is PS-qun, and the join is N:1.

102. The method of claim 91, wherein the S-processing step further comprises changing an extra join to a dropped join and changing the state of the right-hand side quantifier from PS to S.

103. The method of claim 91, wherein the S-processing step further comprises promoting any quantifiers at the S (left- or right-hand side) or PS (right-hand side only) states to the N state.

104. The method of claim 91, wherein the S-processing step further comprises indicating that the partitioning step is completed if no new quantifiers at the N state are introduced by the S-processing step.

105. The method of claim 91, wherein the post-processing step further comprises:

if all the quantifiers are the N state, indicating that the partitioning step failed, if at least one quantifier is the PS state, then promoting all the quantifiers at the PS and S states to the N state, and indicating that the partitioning step failed, otherwise, indicating that the partitioning step was successful.

* * * * *

UNITED STATES PATENT AND TRADEMARK OFFICE
CERTIFICATE OF CORRECTION

PATENT NO.    : 6,438,542 B1                                           Page 1 of 1
DATED         : August 20, 2002
INVENTOR(S)   : Fred Koo and Ting Yu Leung It is certified that error appears in the above-identified patent and that said Letters Patent is hereby corrected as shown below:

Column 20,
Line 4, "(a)" should read -- (b) --
Line 15, after "state" insert -- indicating --

Column 21,
Line 3, "Join" should read -- join --

Column 22,
Line 10, "farther" should read -- further --

Column 23,
Line 9, "71" should read -- 73 --
Line 42, "tape" should read -- type --

Column 24,
Line 8, after "step" insert a colon
Line 47, after the third occurrence of "," insert a space Signed and Sealed this Sixth Day of May, 2003

JAMES E. ROGAN
*Director of the United States Patent and Trademark Office*